US011160124B2

(12) United States Patent
Wang et al.

(10) Patent No.: US 11,160,124 B2
(45) Date of Patent: Oct. 26, 2021

(54) WIRELESS CONNECTION CONTROL METHOD, DISTRIBUTED UNIT, CENTRALIZED UNIT, AND BASE STATION SYSTEM

(71) Applicant: HUAWEI TECHNOLOGIES CO., LTD., Guangdong (CN)

(72) Inventors: Rui Wang, Shanghai (CN); Mingzeng Dai, Shanghai (CN); Xudong Yang, Shanghai (CN); Hongzhuo Zhang, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/673,310

(22) Filed: Nov. 4, 2019

(65) Prior Publication Data

US 2020/0068631 A1 Feb. 27, 2020

Related U.S. Application Data

(63) Continuation of application No. PCT/CN2018/085745, filed on May 5, 2018.

(30) Foreign Application Priority Data

May 5, 2017 (CN) .......................... 201710313783.2

(51) Int. Cl.
H04W 4/00 (2018.01)
H04W 76/11 (2018.01)
(Continued)

(52) U.S. Cl.
CPC .......... H04W 76/11 (2018.02); H04W 72/005 (2013.01); H04W 74/0833 (2013.01); H04W 76/27 (2018.02)

(58) Field of Classification Search
CPC ... H04W 76/11; H04W 76/27; H04W 72/005; H04W 74/0833
See application file for complete search history.

(56) References Cited

U.S. PATENT DOCUMENTS

2017/0041776 A1* 2/2017 Faccin ................. H04L 65/103
2017/0223766 A1   8/2017 Lin
(Continued)

FOREIGN PATENT DOCUMENTS

CN    106162730 A    11/2016
CN    105723801 B     5/2019
(Continued)

OTHER PUBLICATIONS

3GPP TS 36.321 V14.2.1 (Mar. 2017), "3rd Generation Partnership Project;Technical Specification Group Radio Access Network; Evolved Universal Terrestrial Radio Access (E-UTRA); Medium Access Control (MAC) protocol specification (Release 14)," Mar. 2017, 106 pages.

(Continued)

Primary Examiner — Siren Wei
(74) Attorney, Agent, or Firm — Fish & Richardson P.C.

(57) ABSTRACT

This application provides a wireless connection control method relating to a base station system including a centralized unit and a distributed unit, wherein the centralized unit communicates with the distributed unit, and the distributed unit communicates with a terminal through an air interface. The method includes: first receiving, by the distributed unit, a first message sent by the terminal, where the first message is used to request to establish an air interface control plane connection for the terminal; then sending, by the distributed unit, the first message to the centralized unit; and then receiving, by the distributed unit, a second message sent by the centralized unit, where the second message is used to instruct to establish the air interface control plane (Continued)

connection between the terminal and the distributed unit. The method may implement wireless connection control in a 5G system when functions of a base station are separated.

25 Claims, 12 Drawing Sheets

(51) Int. Cl.
  *H04W 76/27* (2018.01)
  *H04W 72/00* (2009.01)
  *H04W 74/08* (2009.01)

(56) References Cited

U.S. PATENT DOCUMENTS

| | | | |
|---|---|---|---|
| 2018/0249388 A1 | 8/2018 | Baek et al. | |
| 2018/0279182 A1* | 9/2018 | Sang | H04W 36/0055 |
| 2019/0132790 A1* | 5/2019 | Lee | H04W 76/30 |
| 2019/0150220 A1* | 5/2019 | Byun | H04W 76/10 370/329 |

FOREIGN PATENT DOCUMENTS

| | | |
|---|---|---|
| EP | 3567923 A1 | 11/2019 |
| JP | 6123009 B1 | 4/2017 |
| KR | 20160132368 A | 11/2016 |
| WO | 2017034269 A1 | 3/2017 |

OTHER PUBLICATIONS

3GPP TS 38.300 V0.1.3 (Apr. 2017): 3rd Generation Partnership Project;Technical Specification Group Radio Access Network; NG Radio Access Network; Overall Description;Stage 2 (Release 15), Apr. 2017, 28 pages.

3GPP TS 38.321 V0.0.3 (May 2017), "3rd Generation Partnership Project;Technical Specification Group Radio Access Network; NR; Medium Access Control (MAC) protocol specification (Release 15)," May 2017, 20 pages.

3GPP TS 38.331 V0.0.2 (Mar. 2017), "3rd Generation Partnership Project; Technical Specification Group Radio Access Network; NR; Radio Resource Control (RRC); Protocol specification (Release 15)," Mar. 2017, 13 pages.

Catt, "Consideration on the protocol stack and functions of CU/DU interface," 3GPP TSG RAN WG3 Meeting #95, R3-170382, Athens, Greece, Feb. 13-17, 2017, 4 pages.

Ericsson, "CU-DU interface protocols," 3GPP TSG RAN WG3 #95bis, Tdoc R3-171164, Spokane, USA, Apr. 3-7, 2017, 3 pages.

Extended European Search Report issued in European Application No. 18794918.5 dated Apr. 2, 2020, 13 pages.

Ill, "Mobility Support for Full RRC Signalings," 3GPP TSG-RAN WG2 #95, R2-165294, Gothenburg, Sweden, Aug. 22-26, 2016, 3 pages.

LG Electronics Inc., "TP for RRC signaling between CU and DU," 3GPP TSG-RAN WG3 Meeting #94, R3-162662, Reno, Nevada, United States, Nov. 14-18, 2016, 3 pages.

PCT International Search Report and Written Opinion issued in International Application No. PCT/CN2018/085745 dated Jul. 18, 2018, 15 pages (with English translation).

ZTE, "The proposed Stage 2 TP for CU-DU interface," 3GPP TSG RAN WG3 Meeting #95bis, R3-171017, Spokane, UAS, Apr. 3-7, 2017, 6 pages.

NTT Docomo, Inc., "CU-DU interface: Overall categorization of C-plane and U-plane," TSG-RAN Working Group 3 meeting #95, R3-170618, Athens,Greece, Feb. 13-17, 2017, 9 pages.

Office Action issued in Korean Application No. 2019-7035991 dated Dec. 27, 2020, 12 pages (with English translation).

Office Action issued in Japanese Application No. 2019-560750 dated Feb. 15, 2021, 11 pages (with English translation).

Samsung, "Discussion of TRP and DU Mobility in NR," 3GPP TSG-RAN WG2 Meeting #95bis, R2-166389, Kaohsiung, Taiwan, Oct. 10-14, 2016, 4 pages.

\* cited by examiner

WIRELESS CONNECTION CONTROL METHOD, DISTRIBUTED UNIT, CENTRALIZED UNIT, AND BASE STATION SYSTEM

CROSS-REFERENCE TO RELATED APPLICATIONS

This application is a continuation of International Application No. PCT/CN2018/085745, filed on May 5, 2018, which claims priority to Chinese Patent Application No. 201710313783.2 filed on May 5, 2017. The disclosures of the aforementioned applications are hereby incorporated by reference in their entireties.

TECHNICAL HELD

This application relates to communications technologies, and in particular, to a wireless connection control method, a distributed unit, a centralized unit, and a base station system.

BACKGROUND

In the 5th generation mobile communications (5G) system, a base station may include a centralized unit (CU) and a distributed unit (DU). To be specific, functions of a base station in an original access network are split, some functions of the base station are deployed in the CU, and remaining functions are deployed in the DU. A plurality of DUs share one CU. This can reduce costs and facilitate network scalability. A CU-DU split may be based on a protocol stack. In a possible manner, a Radio Resource Control (RRC) layer and a Packet Data Convergence Protocol (PDCP) layer are deployed in the CU, and a Radio Link Control (RLC) layer, a Media Access Control (MAC) layer, and a physical layer are deployed in the DU.

A RRC connection establishment process is a necessary process for a terminal to access a communications network. In an existing network architecture in which a base station is a standalone device, for example, in a Long Term Evolution (LTE) system, the base station supports all protocol layer processing. The RRC connection establishment process may be directly processed by the base station. However, in the 5G system, if functions of the base station are completed by the DU and the CU, the RRC connection process needs to be processed through interaction between the DU and the CU. Therefore, a processing method and an interface transmission method during RRC connection establishment by the DU and the CU need to be provided.

SUMMARY

This application provides a wireless connection control method, a distributed unit, a centralized unit, and a base station system, to implement wireless connection control in a 5G system when functions of a base station are separated.

A first aspect of this application provides a wireless connection control method, where the method relates to a base station system, the base station system includes a centralized unit and a distributed unit, the centralized unit communicates with the distributed unit, the distributed unit communicates with a terminal through an air interface, and the method includes:

first receiving, by the distributed unit, a first message sent by the terminal, where the first message is used to request to establish an air interface control plane connection for the terminal; then sending, by the distributed unit, the first message to the centralized unit; and then receiving, by the distributed unit, a second message sent by the centralized unit, where the second message is used to instruct to establish the air interface control plane connection between the terminal and the distributed unit.

In this method, the distributed unit communicating with the terminal sends, to the centralized unit, an air interface control plane connection request message sent by the terminal, so that the centralized unit can perform air interface control plane connection processing, and wireless connection control in a 5G system when functions of a base station are separated is implemented.

In a possible design, the method further includes:
establishing, by the distributed unit, a control plane connection between the distributed unit and the centralized unit, where the sending, by the distributed unit, the first message to the centralized unit includes:
sending, by the distributed unit, a third message to the centralized unit through the control plane connection, where the third message includes the first message, and the third message further includes at least one of the following information:
a first terminal identifier corresponding to the terminal, an identifier of a cell accessed by the terminal, and a second terminal identifier corresponding to the terminal, where the first terminal identifier is used to identify the terminal on the air interface, and the second terminal identifier is an identifier allocated by the distributed unit for the terminal on a control plane interface between the distributed unit and the centralized unit.

In a possible design, the second message is transmitted through the control plane connection; the second message includes a third terminal identifier; and the third terminal identifier is an identifier allocated by the centralized unit for the terminal on the control plane interface between the distributed unit and the centralized unit.

In a possible design, the method further includes:
receiving, by the distributed unit, first signaling bearer configuration information sent by the centralized unit.

In a possible design, the first signaling bearer configuration information includes at least one of the following information:
a first signaling bearer identifier, a Media Access Control layer configuration parameter used by the distributed unit to establish a first signaling bearer, a physical layer configuration parameter used by the distributed unit to establish the first signaling bearer, a logical channel configuration parameter used by the distributed unit to establish the first signaling bearer, and first signaling bearer user plane transmission path establishment information on a centralized unit side.

In a possible design, the distributed unit receives, through the second message, the first signaling bearer configuration information sent by the centralized unit.

In a possible design, the method further includes:
sending, by the distributed unit, first signaling bearer user plane transmission path establishment information on a distributed unit side to the centralized unit.

In a possible design, the sending, by the distributed unit, first signaling bearer user plane transmission path establishment information on a distributed unit side to the centralized unit includes:
adding, by the distributed unit, the first signaling bearer user plane transmission path establishment information on the distributed unit side into the third message, and sending the third message to the centralized unit.

In another possible design, before the sending, by the distributed unit, the first message to the centralized unit, the method further includes:

receiving, by the distributed unit, a fourth message sent by the centralized unit, where the fourth message includes at least one of the following information: a cell identifier, second signaling bearer configuration information, and second signaling bearer user plane transmission path establishment information on the centralized unit side; and sending, by the distributed unit, a fifth message to the centralized unit, where the fifth message includes at least one of the following information: a cell identifier, a second signaling bearer identifier, and second signaling bearer user plane transmission path establishment information on the distributed unit side.

In a possible design, the sending, by the distributed unit, the first message to the centralized unit includes:

sending, by the distributed unit, the first message to the centralized unit through a user plane transmission path corresponding to the second signaling bearer user plane transmission path establishment information on the centralized unit side; and carrying, by the distributed unit, a cell identifier and/or the second terminal identifier into the first message when sending the first message to the centralized unit.

In a possible design, the receiving, by the distributed unit, a second message sent by the centralized unit includes:

receiving, by the distributed unit through a user plane transmission path corresponding to the second signaling bearer user plane transmission path establishment information on the distributed unit side, the second message sent by the centralized unit; and receiving, by the distributed unit, a cell identifier and/or the third terminal identifier that are/is included in the second message sent by the centralized unit.

In another possible design, before the sending, by the distributed unit, the first message to the centralized unit, the method further includes:

sending, by the distributed unit, a sixth message to the centralized unit, where the sixth message is used to request to establish, for the terminal, a user plane transmission path that is between the distributed unit and the centralized unit and that is of a second signaling bearer, and the sixth message includes at least one of the following information: the first terminal identifier corresponding to the terminal, the second terminal identifier corresponding to the terminal, and the identifier of the cell accessed by the terminal; and receiving, by the distributed unit, a seventh message sent by the centralized unit, where the seventh message includes the third terminal identifier and the second signaling bearer user plane transmission path establishment information on the centralized unit side.

In a possible design, the method further includes:

sending, by the distributed unit, second signaling bearer user plane transmission path establishment information on the distributed unit side to the centralized unit.

In a possible design, the distributed unit carries the second signaling bearer user plane transmission path establishment information on the distributed unit side into the sixth message, and sends the sixth message to the centralized unit.

In a possible design, the sending, by the distributed unit, the first message to the centralized unit includes:

sending, by the distributed unit, the first message to the centralized unit through a user plane transmission path corresponding to the second signaling bearer user plane transmission path establishment information on the centralized unit side.

In a possible design, the receiving, by the distributed unit, a second message sent by the centralized unit includes:

receiving, by the distributed unit, the second message on a user plane transmission path corresponding to the second signaling bearer user plane transmission path establishment information on the distributed unit side.

A second aspect of this application provides a wireless connection control method, where the method relates to a base station system, the base station system includes a centralized unit and a distributed unit, the centralized unit communicates with the distributed unit, the distributed unit communicates with a terminal through an air interface, and the method includes:

receiving, by the distributed unit, a first message sent by the terminal, where the first message is used to request to establish an air interface control plane connection for the terminal;

sending, by the distributed unit, an eighth message to the terminal based on the first message, where the eighth message is used to instruct to establish the air interface control plane connection for the terminal; and sending, by the distributed unit, a ninth message to the centralized unit, where the ninth message includes a connection parameter used to establish the air interface control plane connection.

In a possible design, the connection parameter used to establish the air interface control plane connection includes at least one of the following information: a fourth terminal identifier corresponding to the terminal, and a terminal control plane connection establishment cause, where the fourth terminal identifier is a terminal identifier allocated by a core network, or the fourth terminal identifier is a random number.

Corresponding to the first aspect and the second aspect, in a possible design, the method further includes:

sending, by the distributed unit, user plane transmission path establishment information on a distributed unit side to the centralized unit through a control plane connection between the distributed unit and the centralized unit, where the user plane transmission path establishment information on the distributed unit side includes at least one of the following information: first signaling bearer user plane transmission path establishment information on the distributed unit side and third signaling bearer user plane transmission path establishment information on the distributed unit side.

In a possible design, the method further includes:

receiving, by the distributed unit through the control plane connection between the distributed unit and the centralized unit, first signaling bearer configuration information and/or third signaling bearer configuration information that are/is sent by the centralized unit, where the first signaling bearer configuration information includes at least one of the following information: a first signaling bearer identifier, a Media Access Control layer configuration parameter used by the distributed unit to establish a first signaling bearer, a physical layer configuration parameter used by the distributed unit to establish the first signaling bearer, a logical channel configuration parameter used by the distributed unit to establish the first signaling bearer, and first signaling bearer user plane transmission path establishment information on the centralized unit side; and the third signaling bearer configuration information includes at least one of the following information: a third signaling bearer identifier, a Media Access Control layer configuration parameter used by the distributed unit to establish a third signaling bearer, a physical layer configuration parameter used by the distributed unit to establish the third signaling bearer, a logical channel configuration parameter used by the distributed unit to establish the third signaling bearer, and second signaling bearer user plane transmission path establishment information on the centralized unit side.

In a possible design, the method further includes:

receiving, by the distributed unit, data bearer configuration information sent by the centralized unit; and sending, by the distributed unit, data bearer user plane transmission path establishment information on the distributed unit side to the centralized unit, where the data bearer configuration information includes at least one of the following information: a data bearer identifier, a Media Access Control layer configuration parameter used by the distributed unit to establish a data bearer, a physical layer configuration parameter used by the distributed unit to establish the data bearer, a logical channel configuration parameter used by the distributed unit to establish the data bearer, service information used by the distributed unit to process the data bearer, and data bearer user plane transmission path establishment information on the centralized unit side.

A third aspect of this application provides a connection control method, where the method relates to a base station system, the base station system includes a centralized unit and a distributed unit, the centralized unit communicates with the distributed unit, the distributed unit communicates with a terminal through an air interface, and the method includes:

receiving, by the distributed unit, an access request message sent by the terminal;

obtaining, by the distributed unit based on the access request message, a first terminal identifier corresponding to the terminal, where the first terminal identifier is used to identify the terminal on the air interface;

sending, by the distributed unit, the first terminal identifier to the terminal; and sending, by the distributed unit, the first terminal identifier and/or a cell identifier to the centralized unit.

In a possible design, the first terminal identifier is allocated by the distributed unit.

In a possible design, the method further includes:

sending, by the distributed unit, a first request message to the centralized unit, where the first request message is used to request the centralized unit to allocate a terminal identifier set; and receiving, by the distributed unit, the terminal identifier set sent by the centralized unit, where the terminal identifier set includes the first terminal identifier.

A fourth aspect of this application provides a connection control method, where the method relates to a base station system, the base station system includes a centralized unit and a distributed unit, the centralized unit communicates with the distributed unit, the distributed unit communicates with a terminal through an air interface, and the method includes:

receiving, by the distributed unit, an access request message sent by the terminal;

sending, by the distributed unit, a second request message to the centralized unit based on the access request message, where the second request message is used to request the centralized unit to allocate a first terminal identifier for the terminal;

receiving, by the distributed unit, the first terminal identifier sent by the centralized unit; and sending, by the distributed unit, the first terminal identifier to the terminal.

In a possible design, the second request message includes a cell identifier corresponding to a cell accessed by the terminal.

In a possible design, the first terminal identifier is a unique identifier of a wireless network.

A fifth aspect of this application provides a wireless connection control method, where the method relates to a base station system, the base station system includes a centralized unit and a distributed unit, the centralized unit communicates with the distributed unit, the distributed unit communicates with a terminal through an air interface, and the method includes:

receiving, by the centralized unit, a first message sent by the distributed unit, where the first message is used to request to establish an air interface control plane connection for the terminal; and sending, by the centralized unit, a second message to the distributed unit, where the second message is used to instruct to establish the air interface control plane connection between the terminal and the distributed unit.

In a possible design, the first message is included in a third message for transmission, and the third message is transmitted through a control plane connection between the distributed unit and the centralized unit; and the third message further includes at least one of the following information:

a first terminal identifier corresponding to the terminal, an identifier of a cell accessed by the terminal, and a second terminal identifier corresponding to the terminal, where the first terminal identifier is used to identify the terminal on the air interface, and the second terminal identifier is an identifier allocated by the distributed unit for the terminal on a control plane interface between the distributed unit and the centralized unit.

In a possible design, the second message is transmitted through the control plane connection; correspondingly, the second message includes a third terminal identifier; and the third terminal identifier is an identifier allocated by the centralized unit for the terminal on the control plane interface between the distributed unit and the centralized unit.

In a possible design, the method further includes:

sending, by the centralized unit, first signaling bearer configuration information to the distributed unit.

In a possible design, the first signaling bearer configuration information includes at least one of the following information:

a first signaling bearer identifier, a Media Access Control layer configuration parameter used by the distributed unit to establish a first signaling bearer, a physical layer configuration parameter used by the distributed unit to establish the first signaling bearer, a logical channel configuration parameter used by the distributed unit to establish the first signaling bearer, and first signaling bearer user plane transmission path establishment information on a centralized unit side.

In a possible design, the centralized unit sends the first signaling bearer configuration information through the second message.

In a possible design, the method further includes:

receiving, by the centralized unit, first signaling bearer user plane transmission path establishment information that is on a distributed unit side and that is sent by the distributed unit.

In a possible design, the receiving, by the centralized unit, first signaling bearer user plane transmission path establishment information that is on a distributed unit side and that is sent by the distributed unit includes:

receiving, by the centralized unit, the first signaling bearer user plane transmission path establishment information on the distributed unit side through the third message.

In another possible design, before the receiving, by the centralized unit, a first message sent by the distributed unit, the method further includes:

sending, by the centralized unit, a fourth message to the distributed unit, where the fourth message includes at least one of the following information: a cell identifier, second signaling bearer configuration information, and second signaling bearer user plane transmission path establishment information on the centralized unit side; and receiving, by the centralized unit, a fifth message sent by the distributed unit, where the fifth message includes at least one of the following information: a cell identifier, a second signaling bearer identifier, and second signaling bearer user plane transmission path establishment information on the distributed unit side.

In a possible design, the receiving, by the centralized unit, a first message sent by the distributed unit includes:

receiving, by the centralized unit, the first message on a user plane transmission path corresponding to the second signaling bearer user plane transmission path establishment information on the centralized unit side.

In a possible design, the sending, by the centralized unit, a second message to the distributed unit includes:

sending, by the centralized unit, the second message to the distributed unit through a user plane transmission path corresponding to the second signaling bearer user plane transmission path establishment information on the distributed unit side.

In another possible design, before the receiving, by the centralized unit, a first message sent by the distributed unit, the method further includes:

receiving, by the centralized unit, a sixth message sent by the distributed unit, where the sixth message is used to request to establish, for the terminal, a user plane transmission path that is between the distributed unit and the centralized unit and that is of a second signaling bearer, and the sixth message includes at least one of the following information: the first terminal identifier corresponding to the terminal, the second terminal identifier corresponding to the terminal, and the identifier of the cell accessed by the terminal; and sending, by the centralized unit, a seventh message to the distributed unit, where the seventh message includes the third terminal identifier and the second signaling bearer user plane transmission path establishment information on the centralized unit side.

In a possible design, the method further includes:

receiving, by the centralized unit, second signaling bearer user plane transmission path establishment information that is on the distributed unit side and that is sent by the distributed unit.

In a possible design, the second signaling bearer user plane transmission path establishment information on the distributed unit side is carried in the sixth message for transmission.

In a possible design, the receiving, by the centralized unit, a first message sent by the distributed unit includes:

receiving, by the centralized unit, the first message on a user plane transmission path corresponding to the second signaling bearer user plane transmission path establishment information on the centralized unit side.

In a possible design, the sending, by the centralized unit, a second message to the distributed unit includes:

sending, by the centralized unit, the second message to the distributed unit through a user plane transmission path corresponding to the second signaling bearer user plane transmission path establishment information on the distributed unit side.

A sixth aspect of this application provides a wireless connection control method, where the method relates to a base station system, the base station system includes a centralized unit and a distributed unit, the centralized unit communicates with the distributed unit, the distributed unit communicates with a terminal through an air interface, and the method includes:

receiving, by the centralized unit, a ninth message sent by the distributed unit, where the ninth message includes a connection parameter used to establish an air interface control plane connection; and performing, by the centralized unit, connection control processing based on the connection parameter used to establish the air interface control plane connection.

In a possible design, the connection parameter used to establish the air interface control plane connection includes at least one of the following information: a fourth terminal identifier corresponding to the terminal, and a terminal control plane connection establishment cause, where the fourth terminal identifier is a terminal identifier allocated by a core network, or the fourth terminal identifier is a random number.

For the fifth aspect and the sixth aspect, in a possible design, the method further includes:

receiving, by the centralized unit, user plane transmission path establishment information on a distributed unit side through a control plane connection between the distributed unit and the centralized unit, where the user plane transmission path establishment information on the distributed unit side includes at least one of the following information: first signaling bearer user plane transmission path establishment information on the distributed unit side and third signaling bearer user plane transmission path establishment information on the distributed unit side.

In a possible design, the method further includes:

sending, by the centralized unit, first signaling bearer configuration information and/or third signaling bearer configuration information to the distributed unit through the control plane connection between the distributed unit and the centralized unit, where the first signaling bearer configuration information includes at least one of the following information: a first signaling bearer identifier, a Media Access Control layer configuration parameter used by the distributed unit to establish a first signaling bearer, a physical layer configuration parameter used by the distributed unit to establish the first signaling bearer, a logical channel configuration parameter used by the distributed unit to establish the first signaling bearer, and first signaling bearer user plane transmission path establishment information on a centralized unit side; and the third signaling bearer configuration information includes at least one of the following information: a third signaling bearer identifier, a Media Access Control layer configuration parameter used by the distributed unit to establish a third signaling bearer, a physical layer configuration parameter used by the distributed unit to establish the third signaling bearer, a logical channel configuration parameter used by the distributed unit to establish the third signaling bearer, and third signaling bearer user plane transmission path establishment information on the centralized unit side.

In a possible design, the method further includes:

sending, by the centralized unit, data bearer configuration information to the distributed unit; and receiving, by the centralized unit, data bearer user plane transmission path establishment information that is on the distributed unit side and that is sent by the distributed unit, where the data bearer configuration information includes at least one of the following information: a data bearer identifier, a Media Access Control layer configuration parameter used by the distributed unit to establish a data bearer, a physical layer configuration parameter used by the distributed unit to establish the data bearer, a logical channel configuration parameter used by the distributed unit to establish the data bearer, service information used by the distributed unit to process the data bearer, and data bearer user plane transmission path establishment information on the centralized unit side.

A seventh aspect of this application provides a connection control method, where the method relates to a base station system, the base station system includes a centralized unit and a distributed unit, the centralized unit communicates with the distributed unit, the distributed unit communicates with a terminal through an air interface, and the method includes:

receiving, by the centralized unit, a first terminal identifier and/or a cell identifier that are/is sent by the distributed unit, where the first terminal identifier is used to identify the terminal on the air interface; and performing, by the centralized unit, connection control processing based on the first terminal identifier.

In a possible design, the first terminal identifier is allocated by the distributed unit.

In a possible design, the method further includes: receiving, by the centralized unit, a first request message sent by the distributed unit, where the first request message is used to request the centralized unit to allocate a terminal identifier set;

allocating, by the centralized unit, the terminal identifier set; and sending, by the centralized unit, the terminal identifier set to the distributed unit, where the terminal identifier set includes the first terminal identifier.

An eighth aspect of this application provides a connection control method, where the method relates to a base station system, the base station system includes a centralized unit and a distributed unit, the centralized unit communicates with the distributed unit, the distributed unit communicates with a terminal through an air interface, and the method includes:

receiving, by the centralized unit, a second request message sent by the distributed unit, where the second request message is used to request the centralized unit to allocate a first terminal identifier for the terminal;

allocating, by the centralized unit, the first terminal identifier to the terminal; and sending, by the centralized unit, the first terminal identifier to the distributed unit.

In a possible design, the second request message includes a cell identifier corresponding to a cell accessed by the terminal.

In a possible design, the first terminal identifier is a unique identifier of a wireless network.

A ninth aspect of this application provides a distributed unit, where the distributed unit has functions of implementing the distributed unit in the first aspect. These functions may be implemented by hardware, or may be implemented by hardware by executing corresponding software. The hardware or the software includes one or more modules corresponding to the foregoing functions.

In a possible design, the distributed unit may include a receiving module, a processing module, and a sending module. These modules may perform the corresponding functions in the foregoing method. For example, the receiving module is configured to receive a first message sent by a terminal; the processing module is configured to process the first message; and the sending module is configured to send the first message to a centralized unit.

A tenth aspect of this application provides a distributed unit, where the distributed unit has functions of implementing the distributed unit in the second aspect. These functions may be implemented by hardware, or may be implemented by hardware by executing corresponding software. The hardware or the software includes one or more modules corresponding to the foregoing functions.

In a possible design, the distributed unit may include a receiving module, a processing module, and a sending module. These modules may perform the corresponding functions in the foregoing method. For example, the receiving module is configured to receive a first message sent by a terminal; the processing module is configured to send an eighth message to the terminal based on the first message, where the eighth message is used to instruct to establish an air interface control plane connection for the terminal; and the sending module is configured to send a ninth message to a centralized unit, where the ninth message includes a connection parameter used to establish the air interface control plane connection.

An eleventh aspect of this application provides a distributed unit, where the distributed unit has functions of implementing the distributed unit in the third aspect. These functions may be implemented by hardware, or may be implemented by hardware by executing corresponding software. The hardware or the software includes one or more modules corresponding to the foregoing functions.

In a possible design, the distributed unit may include a receiving module, a processing module, and a sending module. These modules may perform the corresponding functions in the foregoing method. For example, the receiving module is configured to receive an access request message sent by a terminal; the processing module is configured to obtain, based on the access request message, a first terminal identifier corresponding to the terminal, where the first terminal identifier is used to identify the terminal on an air interface; and the sending module is configured to send the first terminal identifier to a centralized unit and the terminal.

A twelfth aspect of this application provides a distributed unit, where the distributed unit has functions of implementing the distributed unit in the fourth aspect. These functions may be implemented by hardware, or may be implemented by hardware by executing corresponding software. The hardware or the software includes one or more modules corresponding to the foregoing functions.

In a possible design, the distributed unit may include a receiving module, a processing module, and a sending module. These modules may perform the corresponding functions in the foregoing method. For example, the receiving module is configured to receive an access request message sent by a terminal; the processing module is configured to send a second request message to a centralized unit based on the access request message; and the sending module is configured to send the first terminal identifier to the terminal.

A thirteenth aspect of this application provides a centralized unit, where the centralized unit has functions of implementing the centralized unit in the fifth aspect. These functions may be implemented by hardware, or may be implemented by hardware by executing corresponding software. The hardware or the software includes one or more modules corresponding to the foregoing functions.

In a possible design, the centralized unit may include a receiving module, a processing module, and a sending module. These modules may perform the corresponding functions in the foregoing method. For example, the receiving module is configured to receive a first message sent by a distributed unit; the processing module is configured to generate a second message based on the first message; and the sending module is configured to send the second message to the distributed unit, where the second message is used to instruct to establish an air interface control plane connection between the terminal and the distributed unit.

A fourteenth aspect of this application provides a centralized unit, where the centralized unit has functions of implementing the centralized unit in the sixth aspect. These functions may be implemented by hardware, or may be implemented by hardware by executing corresponding software. The hardware or the software includes one or more modules corresponding to the foregoing functions.

In a possible design, the centralized unit may include a receiving module and a processing module. These modules may perform the corresponding functions in the foregoing method. For example, the receiving module is configured to receive a ninth message sent by a distributed unit, where the ninth message includes a connection parameter used to establish an air interface control plane connection; and the processing module is configured to perform connection control processing based on the connection parameter used to establish the air interface control plane connection.

A fifteenth aspect of this application provides a centralized unit, where the centralized unit has functions of implementing the centralized unit in the seventh aspect. These functions may be implemented by hardware, or may be implemented by hardware by executing corresponding software. The hardware or the software includes one or more modules corresponding to the foregoing functions.

In a possible design, the centralized unit may include a receiving module and a processing module. These modules may perform the corresponding functions in the foregoing method. For example, the receiving module is configured to receive a first terminal identifier sent by the distributed unit, where the first terminal identifier is used to identify the terminal on an air interface; and the processing module is configured to perform connection control processing based on the first terminal identifier.

A sixteenth aspect of this application provides a centralized unit, where the centralized unit has functions of implementing the centralized unit in the eighth aspect. These functions may be implemented by hardware, or may be implemented by hardware by executing corresponding software. The hardware or the software includes one or more modules corresponding to the foregoing functions.

In a possible design, the centralized unit may include a receiving module, a processing module, and a sending module. These modules may perform the corresponding functions in the foregoing method. For example, the receiving module is configured to receive a second request message sent by the distributed unit; the processing module is configured to allocate a first terminal identifier for a terminal; and the sending module is configured to send the first terminal identifier to the distributed unit.

A seventeenth aspect of this application provides a distributed unit, where the distributed unit includes a memory and a processor, the memory is configured to store a program instruction, and the processor is configured to invoke the program instruction in the memory, to implement the method according to the first aspect and the implementations of the first aspect.

An eighteenth aspect of this application provides a distributed unit, where the distributed unit includes a memory and a processor, the memory is configured to store a program instruction, and the processor is configured to invoke the program instruction in the memory, to implement the method according to the second aspect and the implementations of the second aspect.

A nineteenth aspect of this application provides a distributed unit, where the distributed unit includes a memory and a processor, the memory is configured to store a program instruction, and the processor is configured to invoke the program instruction in the memory, to implement the method according to the third aspect and the implementations of the third aspect.

A twentieth aspect of this application provides a distributed unit, where the distributed unit includes a memory and a processor, the memory is configured to store a program instruction, and the processor is configured to invoke the program instruction in the memory, to implement the method according to the fourth aspect and the implementations of the fourth aspect.

A twenty-first aspect of this application provides a centralized unit, where the centralized unit includes a memory and a processor, the memory is configured to store a program instruction, and the processor is configured to invoke the program instruction in the memory, to implement the method according to the fifth aspect and the implementations of the fifth aspect.

A twenty-second aspect of this application provides a centralized unit, where the centralized unit includes a memory and a processor, the memory is configured to store a program instruction, and the processor is configured to invoke the program instruction in the memory, to implement the method according to the sixth aspect and the implementations of the sixth aspect.

A twenty-third aspect of this application provides a centralized unit, where the centralized unit includes a memory and a processor, the memory is configured to store a program instruction, and the processor is configured to invoke the program instruction in the memory, to implement the method according to the seventh aspect and the implementations of the seventh aspect.

A twenty-fourth aspect of this application provides a centralized unit, where the centralized unit includes a memory and a processor, the memory is configured to store a program instruction, and the processor is configured to invoke the program instruction in the memory, to implement the method according to the eighth aspect and the implementations of the eighth aspect.

A twenty-fifth aspect of this application provides a base station system, including any distributed unit in the ninth aspect to the twelfth aspect and any centralized unit in the thirteenth aspect to the sixteenth aspect.

DESCRIPTION OF EMBODIMENTS

Figure 1:
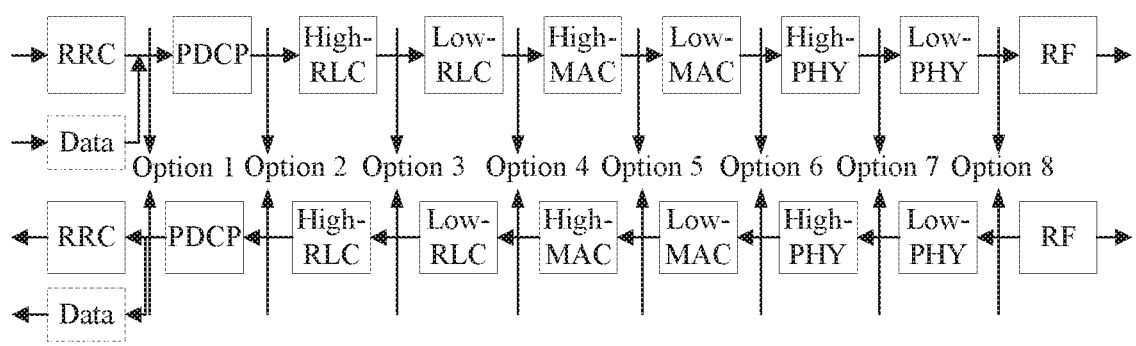
FIG. 1 is a schematic diagram of a CU-DU split.

With rapid development of terminal requirements and technologies, a 5G system or a new radio (NR) access technology is coming soon. The 5G system or the NR system can provide a higher transmission rate than a Long Term Evolution (LTE) network. A highest theoretical transmission rate of the 5G system or the NR system can reach tens of gigabytes (GB) per second.

An architecture of an access network in an existing 2/3/4G network basically includes a core network and an access network. However, there is basically no service level interconnection between access networks. For example, an Iur interface in 3G is used for signaling and data exchange between RNCs, and a base station X2 interface in 4G is mainly used for exchanging resource preparation signaling for handover of UE across base stations, or used for signaling and data exchange between eNodeBs. Therefore, it is difficult to perform dynamic (or semi-dynamic) collaborative adaptation in various aspects such as resource coordination, processing load sharing, and interference suppression. From the perspective of a layout of an equipment room, not only a physical base station but also a logical base station is one-stop. The base stations are separated from each other, and have no substantive association with each other.

In current 5G, when a base station (e.g. gNB) includes CU and DU, the CU is usually responsible for centralized radio resource and connection management control, and the DU usually includes functions of implementing distributed user plane processing, mainly, a physical layer processing function and a layer 2 function that has a relatively high real-time requirement.

The CU device includes a function of processing a wireless upper-layer protocol stack, for example, a RRC layer or a PDCP layer, and can even support moving some functions of the core network down to the access network, forming an edge computing network, which can meet a higher network latency requirement of emerging services such as a video, online shopping, and virtual/augmented reality in a future communications network. Because of a change in a structure of a communications network element, a protocol stack is correspondingly adjusted and changed. Therefore, the name of a next generation network, 5G NR (New Radio), also vividly reflects radical changes in many aspects of a future 5G network.

The CU covers the wireless access network upper-layer protocol stack and some functions of the core network, and the DU covers a baseband processing physical layer and some layer 2 functions. The CU may be deployed in a centralized manner. DU deployment depends on an actual network environment. The DU may also be deployed in a centralized manner in a core urban area or an area such as a college or a large venue that has relatively high traffic density, a relatively short inter-site distance, and limited equipment room resources. The DU may be deployed in a distributed manner in an area such as a suburban county or a mountain area that has relatively sparse traffic density, a relatively long inter-site distance, and the like.

In an existing LTE system, when a terminal initially accesses a network, or changes from an idle state to an active state, or is handed over to a new cell, or experiences a radio link failure, or the like, a wireless connection needs to be established or re-obtained. In this case, a process such as RRC connection establishment or RRC connection re-establishment may be triggered. In an existing cellular wireless system, a base station, as a standalone device base station, supports all protocol layer processing. Both establishment of a wireless connection and processing of protocol layer messages such as a related MAC message and RRC message are directly completed by the base station.

In the 5G system, the gNB may use a CU-DU architecture. There may be a plurality of possibilities for a CU-DU function split. FIG. 1 is a schematic diagram of a CU-DU split. As shown in FIG. 1, the CU-DU architecture includes RRC, PDCP, low-RLC, high-MAC, low-MAC, high physical layer (PHY), low-PHY, and radio frequency (RF). Option 1 may be splitting between the RRC and the PDCP. Option 2 is splitting between the PDCP and RLC. Option 3 is splitting the RLC into two parts. A function with a low real-time requirement is placed in the high-RlX, a function with a high real-time requirement is placed in the low-RLC, and the split is performed between the high-RLC and the low-RLC. Option 4 is splitting between the RLC and MAC. Option 5 is splitting between the high-MAC and the low-MAC. Option 6 is splitting between the low-MAC and the high-PHY Option 7 is splitting between the high-PHY and the low-PHY. Option 8 is splitting between the low-PHY and the RF. For example, in Option 2, for downlink RRC message and data processing the CU generates a RRC message or data, and after PDCP layer processing, transmits a PDCP protocol data unit (PDU) (namely, an RLC service data unit (SDU)) to the DU through an interface between the CU and the DU. After corresponding RLC, MAC, and PHY processing, the DU further sends the PHY processed result to a wireless channel through the RF for transmission. For uplink RRC message and data processing, after the DU receives a data packet through a radio frequency apparatus, the data packet successively experiences PHY, MAC, and RLC processing, and then the DU transmits an RLC SDU (namely, a PDCP PDU) to the CU through an interface between the CU and the DU. The CU further obtains a RRC message or data through PDCP layer processing, and correspondingly sends the RRC message or the data to a RRC layer or an application layer. It should be particularly noted that with evolution of communications technologies, a protocol layer function and a naming manner of the base station, and message content and a name thereof may be different from those in LTE. For example, an original RLC layer resequencing function may be moved up to the PDCP layer. For another example, an original RRC connection request message may have another name. In this application, no limitation is imposed on a protocol layer, a protocol layer function, protocol layer naming, and a protocol layer message name of a specific CU or DU. For ease of description, a protocol layer name and a corresponding message name in the LTE are used as examples to describe a corresponding solution.

Figure 2:
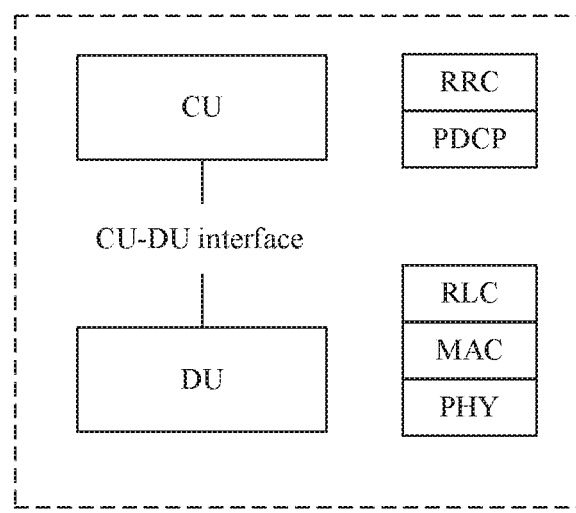
FIG. 2 is a schematic structural diagram of base station protocol layers of a 5G system.

With reference to the options shown in FIG. 1, FIG. 2 is a schematic structural diagram of base station protocol layers of a 5G system. As shown in FIG. 2, a CU includes a RRC layer and a PDCP layer, and a DU includes an RLC layer, a MAC layer, and a PHY layer.

"First", "second", and the like mentioned in this application are not intended to indicate any order, quantity or importance, but are merely used to differentiate between components. Likewise, "a/an", "one", or the like is not intended to indicate a quantity limitation either, but is intended to indicate existing at least one. "Connection", "link", or the like is not limited to a physical or mechanical connection, but may include an electrical connection, whether direct or indirect.

A "module" mentioned in this application usually refers to a program or an instruction that is stored in a memory and can implement some functions. A "unit" mentioned in this specification usually refers to a functional structure divided based on logic. The "unit" may be implemented by only hardware, or implemented by a combination of software and hardware.

"A plurality of" mentioned in this application refers to two or more than two. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

Technologies described in this application may be applied to various communications systems, for example, current 2G and 3G communications systems and a new radio access network, for example, a Global System for Mobile Communications (GSM), a Code Division Multiple Access (CDMA) system, a Time Division Multiple Access (TDMA) system, a Wideband Code Division Multiple Access (WCDMA) system, a Frequency Division Multiple Access (FDMA) system, an Orthogonal Frequency Division Multiple Access (OFDMA) system, a single carrier FDMA (SC-FDMA) system, a general packet radio service (GPRS) system, a Long Term Evolution (LTE) system, a UMTS network, and another communications system. The new radio access network can provide a higher transmission rate than an LTE network. The new radio access network is also referred to as a 5G network, a next generation network, or the like.

In this specification, various aspects are described with reference to a terminal and/or a base station and/or a base station controller.

The terminal may be a wireless terminal or a wired terminal. The wireless terminal may be a device that provides a terminal with voice and/or data connectivity, a handheld device with a wireless connection function, or another processing device connected to a wireless modem. The wireless terminal may communicate with one or more core networks through a radio access network (for example, RAN, Radio Access Network). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, the wireless terminal may be a device such as a personal communications service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile console (Mobile), a remote station, an access point, a remote terminal, an access terminal, a user terminal, user equipment, or a user agent.

The base station (namely a node) may be a device that communicates with the wireless terminal on an air interface in an access network through one or more sectors. The base station may be configured to mutually convert a received over-the-air frame and an IP packet and serve as a router between the wireless terminal and a remaining part of the access network, where the remaining part of the access network may include an Internet protocol (IP) network. The base station may further coordinate attribute management of the air interface. For example, the base station may be a base transceiver station (BTS) in the GSM system or the CDMA system, or may be a NodeB in the WCDMA system, or may be an evolved NodeB (eNodeB, eNB, or e-NodeB) in the LTE system. This is not limited in this application. An access network device of the new radio access network is also referred to as a gNB, an NR Node or an NR base station, a New RAN Node, or a New RAN base station, and is not limited herein. However, for ease of description, the access network device is collectively referred to as a gNB in this specification.

The base station controller (namely a control node) may be a base station controller (BSC) in the GSM or the CDMA, or may be a radio network controller (RNC) in the WCDMA. This is not limited in this application.

Figure 3:
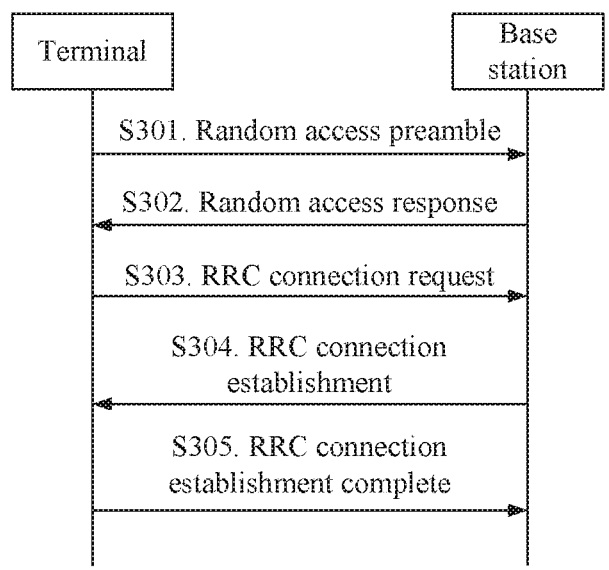
FIG. 3 is a schematic flowchart of establishing a RRC connection by a terminal through random access in an LIT system.

FIG. 3 is a schematic flowchart of establishing a RRC connection by a terminal through random access in an LTE system. As shown in FIG. 3, a process of establishing the RRC connection by the terminal through the random access in the LTE system is as follows.

S301. The terminal sends a random access preamble to a base station.

The terminal sends the random access preamble to the base station on a physical random access channel (PRACH), to notify the base station that there is a random access request, and to enable the base station to estimate a transmission latency between the base station and the terminal and calibrate uplink timing based on the transmission latency.

S302. The base station sends a random access response (RAR) to the terminal.

After sending the random access preamble, the terminal monitors a physical downlink control channel (PDCCH) in a RAR time window. If no RAR returned by the base station is received within the RAR time window, it is considered that this random access process fails.

A RAR MAC protocol data unit (PDU) carries a cell radio network temporary identifier (C-RNTI). If the terminal does not have a unique identifier C-RNTI used to access a cell, the C-RNTI in the RAR MAC PDU of the terminal is used as a temporary C-RNTI (TC-RNTI), The TC-RNTI is used for subsequent transmission between the terminal and the base station. After contention resolution, the value may be changed to a C-RNTI.

The terminal sends a RRC connection request to the base station.

The RRC connection request includes a unique identifier of the terminal. The identifier is used for contention resolution in S304. For a terminal in a RRC_CONNECTED state, a unique identifier of the terminal is a C-RNTI. For a terminal in a non-RRC_CONNECTED state, a unique terminal identifier (an S-TMSI or a random number) from a core network is used as an identifier of the terminal.

When the terminal sends the RRC connection request during the random access process, if the terminal does not have a C-RNTI, the terminal may carry the terminal identifier (an S-TMSI or a random number) of the core network.

S304. The base station sends a RRC connection establishment message to the terminal.

In a contention resolution mechanism, the base station carries the unique identifier of the terminal corresponding to the RRC connection request into a UE Contention Resolution Identity MAC Control Element message, to specify a winning terminal. The winning terminal confirms, based on the unique identifier of the terminal, that the terminal wins, and then uses a TC-RNTI as a C-RNTI.

S305. The terminal sends a RRC connection establishment complete message to the base station.

It can be learned from the foregoing steps that in the LTE system, the base station, as a standalone device, performs processing in a RRC connection establishment process. However, with evolution of the system, after the base station is split into two independent functional entities, namely, a DU and a CU, based on a protocol stack, an existing processing method cannot be directly used.

A wireless connection control method provided in this application is intended to resolve the foregoing problem in the prior art.

When a terminal accesses a wireless network, an access network device needs to allocate an identifier (referred to as a first terminal identifier) for the terminal, so as to identify the terminal on an air interface between the access network device and the terminal. The first terminal identifier may be, for example, a C-RNTI. In a system architecture to which this application is applied, the first terminal identifier is allocated by a base station system, and specifically, may be allocated by a distributed unit, or may be allocated by a centralized unit, or may be distributed jointly by a distributed unit and a centralized unit. The following specifically describes implementations in which the base station system allocates the foregoing identifier.

To help persons skilled in the art understand a solution in this application, in the following embodiment in this application of allocating the first terminal identifier, a procedure in which the terminal initiates a random access request to the base station system and then initiates a RRC connection request is used as an example for description. However, it should be noted that a process of allocating the first terminal identifier in the following embodiment may also be applied to another process in which a first terminal identifier needs to be allocated. For example, the random access request in the following embodiment may also be another access request message. For another example, the RRC connection request in the following embodiment may also be a RRC re-establishment request, or the like.

Figure 4:
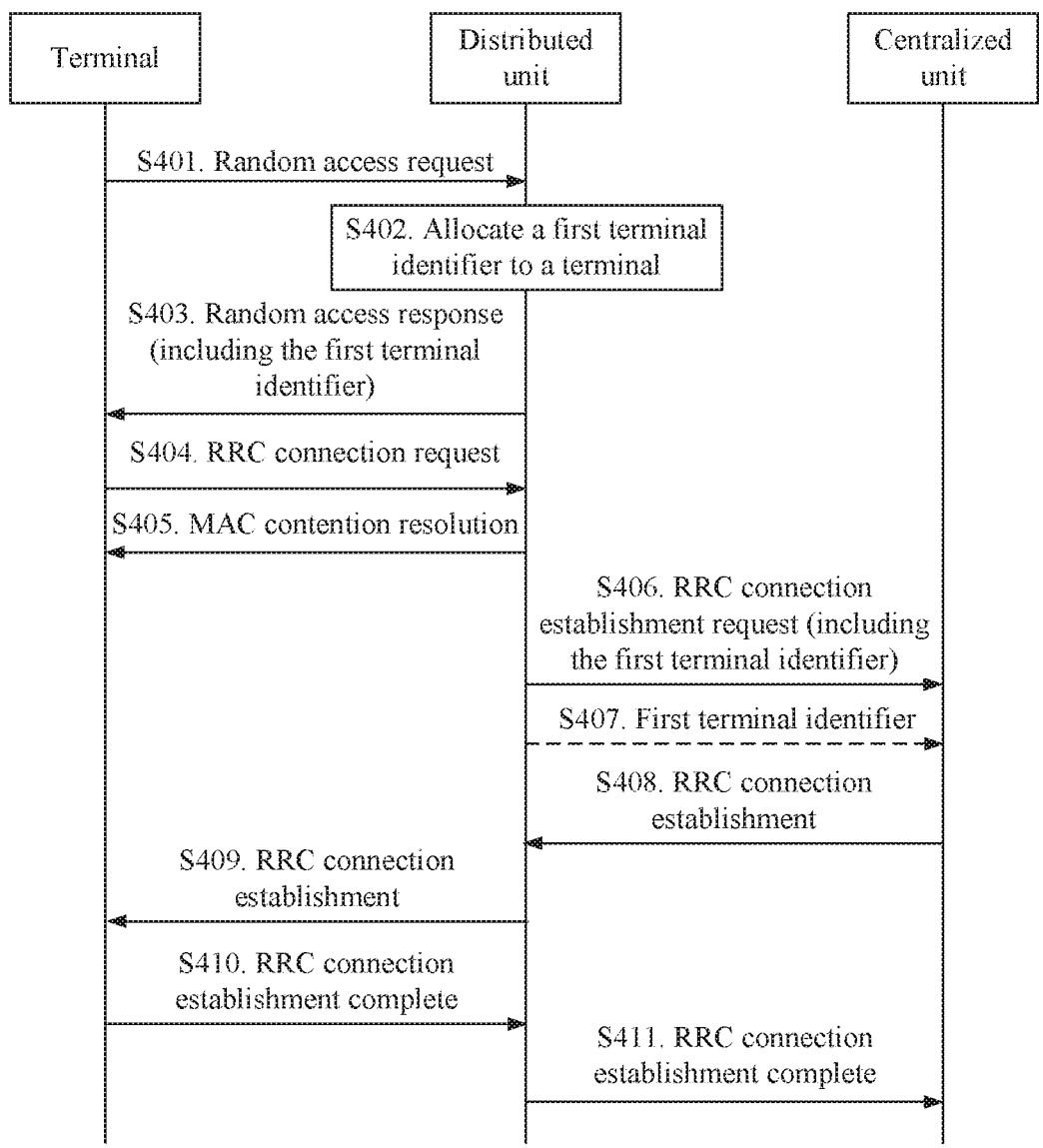
FIG. 4 is a schematic flowchart of a connection control method embodiment 1 according to this application.

FIG. 4 is a schematic flowchart of a connection control method embodiment 1 according to this application. In this process, a distributed control unit allocates a first terminal identifier. As shown in FIG. 4, the process includes the following steps.

S401. A terminal sends a random access request to a distributed unit.

S402. The distributed unit allocates a first terminal identifier for the terminal.

The first terminal identifier is allocated by a base station system, and is used to identify the terminal on an air interface between the access network device and the terminal. The first terminal identifier may be specifically a C-RNTI.

Optionally, the first terminal identifier may be a unique identifier of a wireless network in a cell, or may be a unique identifier of a wireless network in the distributed unit, or may be a unique identifier of a wireless network in a centralized unit connected to the distributed unit.

In the base station system in this application, there may be a plurality of cells in each distributed unit. If the first terminal identifier is the unique identifier of the wireless network in the cell, it indicates that the first terminal identifier is unique in a range of one of the plurality of cells in the distributed unit, and first terminal identifiers in a plurality of cells in one distributed unit may be the same. If the first terminal identifier is the unique identifier of the wireless network in the distributed unit, it indicates that the first terminal identifier is unique in a range of the distributed unit, and first terminal identifiers in different cells are different. If the first terminal identifier is the unique identifier of the wireless network in the centralized unit connected to the distributed unit, it indicates that the first terminal identifier is unique in a range of the centralized unit, and first terminal identifiers in different distributed units or different cells may be different.

S403. The distributed unit sends a random access response to the terminal, where the random access response includes the allocated first terminal identifier.

S404. The terminal sends a RRC connection request to the distributed unit.

The RRC connection request includes a fourth terminal identifier corresponding to the terminal. In a possible manner, the fourth terminal identifier is a terminal identifier (for example, an S-temporary mobile subscriber identity (S-TMSI) allocated by a core network entity. Alternatively, in another possible manner, the fourth terminal identifier may be a random number generated by a terminal. The fourth terminal identifier is used to identify the terminal in a management range of the core network entity.

After sending the RRC connection request, the terminal starts a timer T1.

S405. The distributed unit uses a MAC message to indicate UE contention resolution.

After receiving the RRC connection request and identifying the terminal, the distributed unit uses a MAC message to indicate the UE contention resolution. Specifically, the MAC message carries the foregoing fourth terminal identifier. Optionally, the foregoing fourth terminal identifier may be carried in a MAC control element (CE) for sending. After receiving the MAC CE, the terminal determines whether a terminal identifier carried in the MAC CE is the same as the fourth terminal identifier carried in the RRC connection request sent by the terminal. If the terminal identifier carried in the MAC CE is the same as the fourth terminal identifier carried in the RRC connection request sent by the terminal, it indicates that random access of the terminal succeeds, and then the terminal stops the timer T1; or if the terminal identifier carried in the MAC CE is different from the fourth terminal identifier carried in the RRC connection request sent by the terminal, it indicates that random access of the terminal fails, and then the terminal stops the timer T1, and may initiate a new random access request.

S406. The distributed unit sends a RRC connection establishment request to a centralized unit, where the RRC connection establishment request includes the first terminal identifier.

After receiving the RRC connection establishment request, the distributed unit sends the RRC connection establishment request to the centralized unit through an interface between the distributed unit and the centralized unit. Optionally, the distributed unit may transmit the foregoing request through a control plane connection between the distributed unit and the centralized unit. Further optionally, in this case, the RRC connection request is sent in a RRC container. Alternatively, the distributed unit may transmit the foregoing request through a user plane transmission path between the distributed unit and the centralized unit. A specific transmission method is to be described in detail in a subsequent embodiment of this application.

Further, if the foregoing first terminal identifier is the unique identifier of the wireless network in the cell, the sent RRC connection establishment request further carries a cell identifier, so that the centralized unit can identify the terminal after receiving the RRC connection establishment request.

S407. The distributed unit sends the first terminal identifier to the centralized unit.

This step is an optional step. When the distributed unit does not carries the first terminal identifier into the RRC connection establishment request while sending the RRC connection establishment request in step S406, a separate message may be used to send the first terminal identifier in this step.

When the RRC connection establishment request sent in step S406 already includes the first terminal identifier, this step does not need to be performed.

Correspondingly, a manner of processing the cell identifier is also the same. Details are not described herein again.

S408. The centralized unit sends a RRC connection establishment message to the distributed unit.

S409. The distributed unit sends the RRC connection establishment message to the terminal.

S410. The terminal sends a RRC connection establishment complete message to the distributed unit.

S411. The distributed unit sends the RRC connection establishment complete message to the centralized unit.

In the foregoing procedure, steps S406 to S408 and step S405 may be performed in the other way around. In other words, steps S406 to S408 may be performed before S405.

In the foregoing procedure, if step S407 needs to be performed, that is, the first terminal identifier is not carried in the RRC connection establishment request when the RRC connection establishment request is sent in step S406, steps S406 and S407 may be performed in the other way around. In other words, the distributed unit may first send the first terminal identifier to the centralized unit, and then send the RRC connection establishment request to the centralized unit.

In the foregoing procedure, the messages corresponding to steps S405 and S409 may be sent through a same physical layer message, so as to save air interface transmission resources.

Further, after obtaining the first terminal identifier, the centralized unit may perform connection control processing based on the first terminal identifier. For example, after the terminal moves from a current cell to another cell, the centralized unit may obtain, based on the first terminal identifier, information and the like of the cell before handover of the terminal.

In this embodiment, after receiving the access request from the terminal, the distributed unit allocates the first terminal identifier for the terminal, and separately sends the first terminal identifier to the terminal and the centralized unit, so that in the base station system to which this application is applied, the terminal, and the distributed unit and the centralized unit that are in the base station system all can obtain the first terminal identifier, ensuring normal wireless connection of the terminal in the base station system.

It should be particularly noted that the RRC connection establishment message sent by the centralized unit to the distributed unit may indicate that the centralized unit decides to accept a connection establishment request of the terminal or reject air interface control plane connection establishment for the terminal. In this case, if the RRC connection establishment message indicates that the centralized unit rejects the air interface control plane connection establishment for the terminal, after the distributed unit sends the RRC connection establishment message to the terminal, the distributed unit deletes all resources used by and reserved for the terminal and configuration information corresponding to the terminal. Therefore, in this application, only a case in which the RRC connection establishment message indicates that the wireless connection establishment request of the terminal is accepted is used as an example, to describe subsequent steps. Processing in the following other implementations is similar to that in this implementation.

In an optional implementation, in the foregoing step S404, when sending the RRC connection establishment request to the distributed unit, the terminal may carry the fourth terminal identifier into the MAC layer message, and after receiving the MAC layer message, the distributed unit may obtain a specific value of the fourth terminal identifier.

Correspondingly, in step S405, when the distributed unit uses the MAC message to indicate the UE contention resolution, the MAC message may accurately carry the fourth terminal identifier.

Specifically, in the base station system in this application, the distributed unit cannot parse RRC layer message content, and the RRC connection establishment request sent by the terminal in S404 is a RRC layer message. If the fourth terminal identifier is directly carried into the RRC layer message, the distributed unit cannot learn the specific value of the fourth terminal identifier included in the RRC layer message. When the distributed unit indicates the contention resolution to the terminal in S405, the distributed unit can send, to the terminal, only data of fixed bits of the message received in S404. If the fourth terminal identifier occupies a small quantity of bits, but the distributed unit makes a copy based on the fixed bits, a waste of air interface transmission resources may be caused.

In this embodiment, the terminal carries the fourth terminal identifier into the MAC layer message used for sending the RRC connection establishment request. For example, the terminal may carries the fourth terminal identifier into the MAC CE. After receiving the MAC layer message, the distributed unit may obtain specific content of the fourth terminal identifier. Further, when the distributed unit indicates the contention resolution to the terminal, the distributed unit can carry the specific content of the fourth terminal identifier into the corresponding MAC layer message, without carrying redundant information. Therefore, the waste of the air interface transmission resources is avoided.

It should be noted that the method in this embodiment can be applied to all the following embodiments of this application. Details are not described below again in this application.

Figure 5:
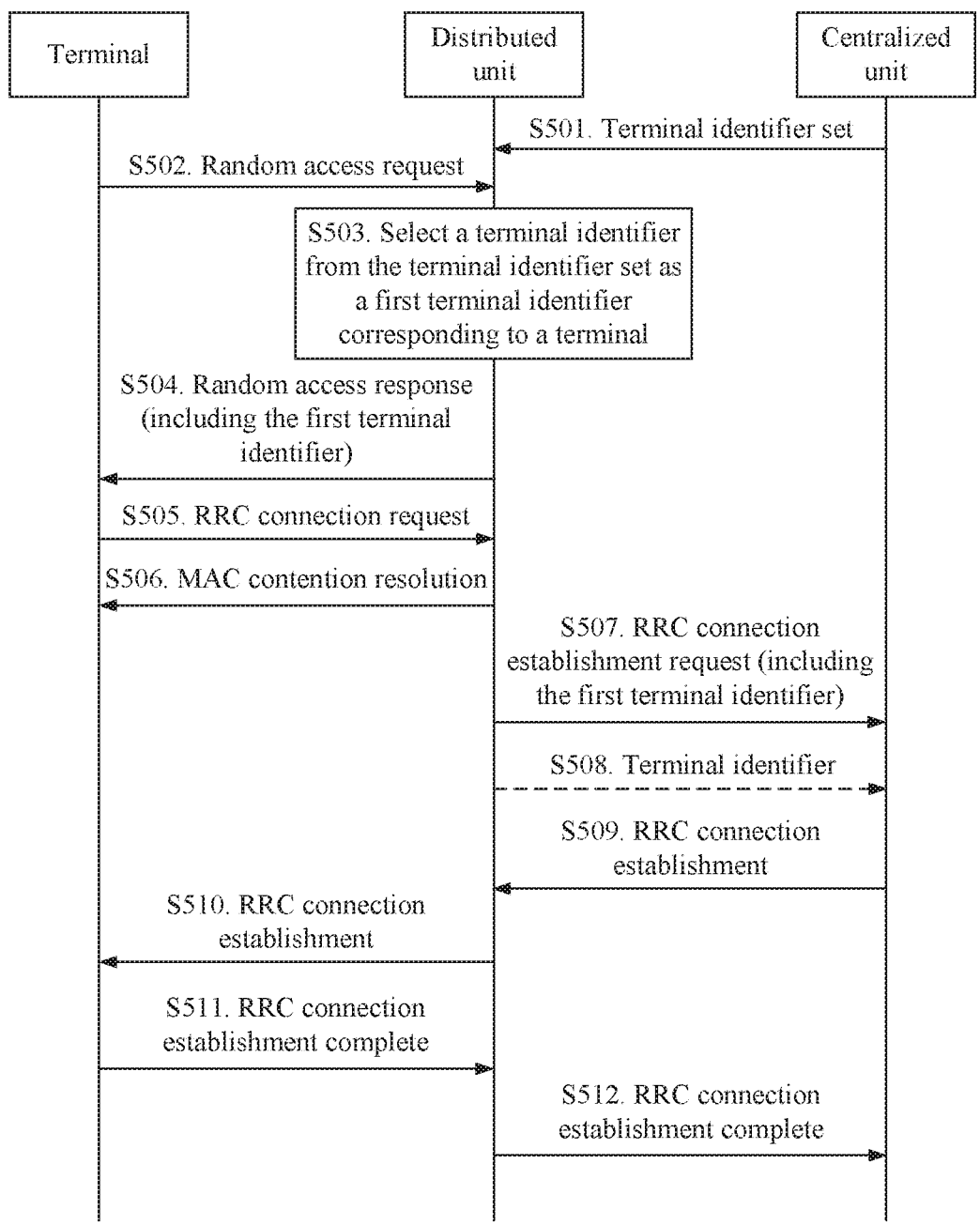
FIG. 5 is a schematic flowchart of a connection control method embodiment according to this application.

FIG. 5 is a schematic flowchart of a connection control method embodiment 2 according to this application. In this process, a distributed unit allocates a first terminal identifier for a terminal based on a terminal identifier set pre-allocated by a centralized unit. As shown in FIG. 5, the process includes the following steps.

S501. The centralized unit sends the terminal identifier set to the distributed unit.

The terminal identifier set is specifically a set of available first terminal identifiers in the distributed unit.

Optionally, the distributed unit may send a first request message to the centralized unit, to request the centralized unit to allocate the terminal identifier set. Alternatively, the centralized unit may actively allocate the terminal identifier set for the distributed unit, and send the terminal identifier set to the distributed unit.

In the base station system in this application, one centralized unit may be connected to a plurality of distributed units, and each distributed unit may request the centralized unit to allocate a terminal identifier set for the distributed unit. Each first terminal identifier allocated by the distributed unit for the terminal that accesses the distributed unit is from the terminal identifier set.

Optionally, terminal identifiers in the terminal identifier set allocated by the centralized unit for different distributed units may be the same or different. To be specific, the first terminal identifier may be unique in a range of the centralized unit or unique in a range of the distributed unit. The centralized unit may allocate the terminal identifier set based on network configuration requirements.

S502. The terminal sends a random access request to the distributed unit.

S503. The distributed unit selects a terminal identifier from the terminal identifier set as the first terminal identifier corresponding to the terminal.

In other words, the foregoing terminal identifier set includes the first terminal identifier corresponding to the terminal.

After obtaining the terminal identifier set, the distributed unit may allocate the first terminal identifier for the accessed terminal based on the cases in which the first terminal identifier is unique in the cell or unique in the distributed unit.

Specifically, if the first terminal identifier is a unique identifier of a wireless network in the cell, when the distributed unit selects the first terminal identifier from the terminal identifier set for the accessed terminal, the distributed unit needs to select a terminal identifier that has not been used in the cell in which the accessed terminal is located as the first terminal identifier of the accessed terminal. If the first terminal identifier is a unique identifier of a wireless network in the distributed unit, when the distributed unit selects the first terminal identifier from the terminal identifier set for the accessed terminal, the distributed unit needs to select a terminal identifier that has not been used in the terminal identifier set as the first terminal identifier of the accessed terminal.

S504. The distributed unit sends a random access response to the terminal, where the random access response includes the allocated first terminal identifier.

S505. The terminal sends a RRC connection request to the distributed unit.

For a specific process, refer to the foregoing step S404. Details are not described herein again.

S506. The distributed unit uses a MAC message to indicate UE contention resolution.

For a specific process, refer to the foregoing step S405. Details are not described herein again.

S507. The distributed unit sends a RRC connection establishment request to the centralized unit, where the RRC connection establishment request includes the first terminal identifier.

For a specific process, refer to the foregoing step S406. Details are not described herein again.

S508. The distributed unit sends the first terminal identifier to the centralized unit.

This step is an optional step. When the distributed unit does not carry the first terminal identifier into the RRC connection establishment request in step S509, a separate message may be used to send the first terminal identifier in this step.

When the RRC connection establishment request sent in step S509 already includes the first terminal identifier, this step does not need to be performed.

Correspondingly, manners of processing a cell identifier and an identifier of the distributed unit are also the same. Details are not described herein again.

S509. The centralized unit sends a RRC connection establishment message to the distributed unit.

S510. The distributed unit sends the RRC connection establishment message to terminal.

S511. The terminal sends a RRC connection establishment complete message to the distributed unit.

S512. The distributed unit sends the RRC connection establishment complete message to the centralized unit.

In the foregoing procedure, step S506 and step S507 may be performed in the other way around. In other words, step S507 may be performed before S506.

In the foregoing procedure, step S501 and step S502 may be performed in the other way around. In other words, step S502 may be performed before S501.

In the foregoing procedure, if step S508 needs to be performed, that is, the first terminal identifier is not carried in the RRC connection establishment request when the RRC connection establishment request is sent in step S507, steps S507 and S508 may be performed in the other way around. In other words, the distributed unit may first send the first terminal identifier to the centralized unit, and then send the RRC connection establishment request to the centralized unit.

In the foregoing procedure, the messages corresponding to steps S506 and S510 may be sent through a same physical layer message, so as to save air interface transmission resources.

In this embodiment, the first terminal identifier allocated by the distributed unit for the terminal is selected from the terminal identifier set sent in advance by the centralized unit. In other words, the centralized unit performs division of a first terminal identifier for all the plurality of distributed units connected to the centralized unit. Therefore, flexibility of network configuration is improved.

Figure 6:
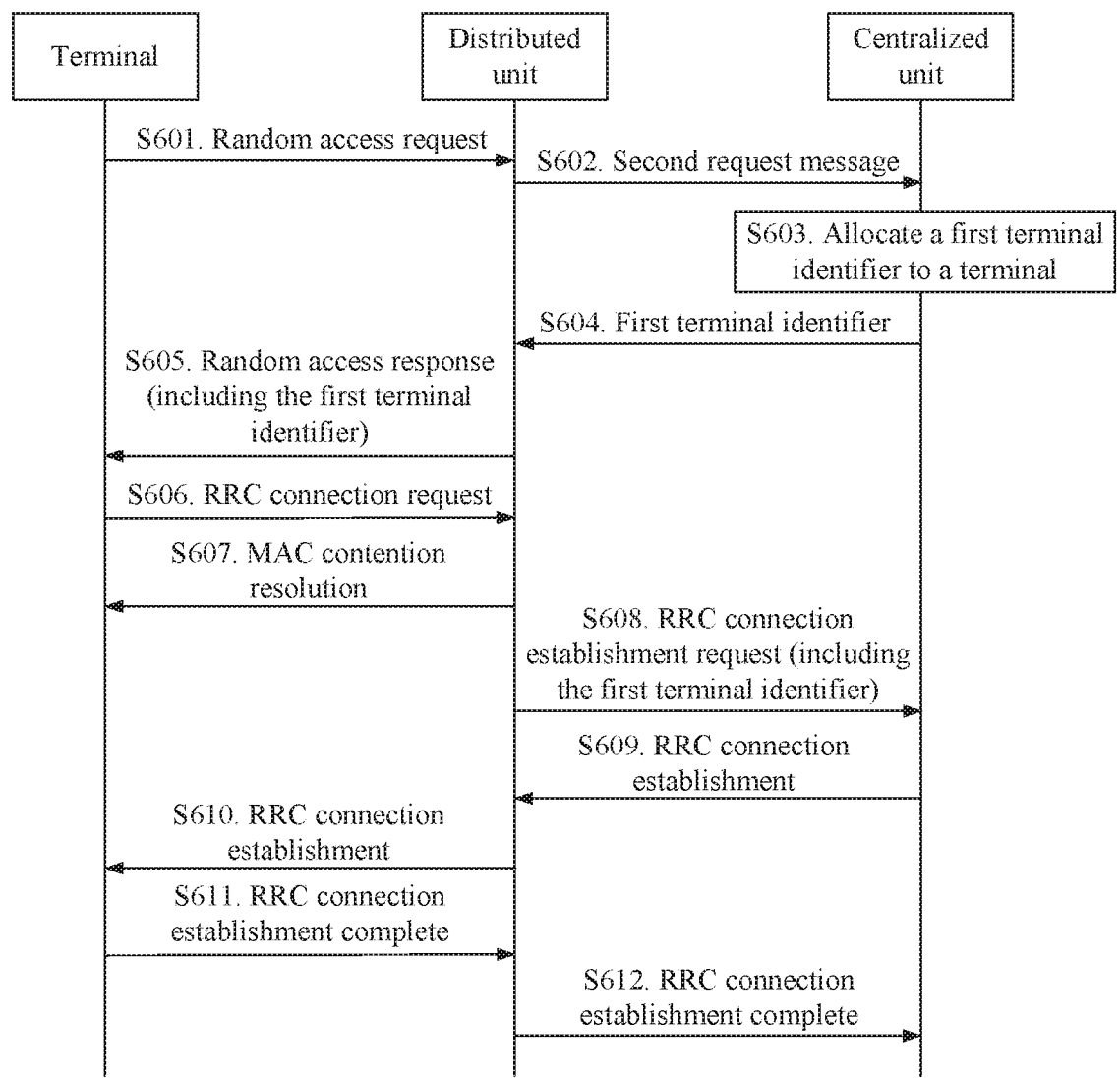
FIG. 6 is a schematic flowchart of a connection control method embodiment 3 according to this application.

FIG. 6 is a schematic flowchart of a connection control method embodiment 3 according to this application. In this process, a centralized unit allocates a first terminal identifier for a terminal. As shown in FIG. 6, the process includes the following steps.

S601. The terminal sends a random access request to a distributed unit.

S602. The distributed unit sends a second request message to the centralized unit, where the second request message is used to request the centralized unit to allocate the first terminal identifier for the terminal.

S603. The centralized unit allocates the first terminal identifier for the terminal.

The first terminal identifier may be unique in a range of a cell, or may be unique in a range of the distributed unit, or may be unique in a range of the centralized unit.

Specifically, if the first terminal identifier is unique in the range of the cell, when the distributed unit sends the second request message to the centralized unit, the second request message needs to carry a cell identifier of the terminal. Then, after receiving the second request message, the centralized unit allocates, for the terminal based on the cell identifier, a first terminal identifier that has not been used in a cell corresponding to the cell identifier.

If the first terminal identifier is unique in the range of the distributed unit, the centralized unit determines, based on an interface through which the second request message is received, a distributed unit that sends the second request message, that is, determines the distributed unit to which the terminal belongs, and then allocates, for the terminal, a first terminal identifier that has not been used in the distributed unit.

If the first terminal identifier is unique in the range of the centralized unit, the centralized unit allocates, for the terminal, a first terminal identifier that has not been used in the centralized unit.

S604. The centralized unit sends the first terminal identifier to the distributed unit.

S605. The distributed unit sends a random access response to the terminal, where the random access response includes the allocated first terminal identifier.

S606. The terminal sends a RRC connection request to the distributed unit.

For a specific process, refer to the foregoing step S404. Details are not described herein again.

S607. The distributed unit indicates UE contention resolution through a MAC message.

For a specific process, refer to the foregoing step S405. Details are not described herein again.

S608. The distributed unit sends a RRC connection establishment request to the centralized unit.

After receiving the RRC connection establishment request, the distributed unit sends the RRC connection establishment request to the centralized unit through an interface between the distributed unit and the centralized unit. Optionally, the distributed unit may transmit the foregoing request through a control plane connection between the distributed unit and the centralized unit, or transmit the foregoing request through a user plane transmission path between the distributed unit and the centralized unit. A specific transmission method is to be described in detail in a subsequent embodiment of this application.

It should be noted that in this embodiment, because the first terminal identifier is directly allocated by the centralized unit, the distributed unit does not need to send the first terminal identifier to the centralized unit.

S609. The centralized unit sends a RRC connection establishment message to the distributed unit.

S610. The distributed unit sends the RRC connection establishment message to the terminal.

S611. The terminal sends a RRC connection establishment complete message to the distributed unit.

S612. The distributed unit sends the RRC connection establishment complete message to the centralized unit.

In the foregoing procedure, step S607 and step S608 may be performed in the other way around. In other words, step S608 may be performed before S607.

In the foregoing procedure, the messages corresponding to steps S607 and S610 may be sent through a same physical layer message, so as to save air interface transmission resources.

In another embodiment, the first terminal identifier allocated by the distributed unit for the terminal may be selected from the terminal identifier set sent in advance by the centralized unit. In other words, the centralized unit performs division of a first terminal identifier for all the plurality of distributed units connected to the centralized unit. Therefore, flexibility of network configuration is improved.

After obtaining the first terminal identifier, the terminal may initiate an air interface control plane connection request. For example, the terminal may initiate a RRC connection request, or the terminal may initiate a RRC re-establishment request. Optionally, the terminal may obtain the first terminal identifier based on any one of the different manners in which the base station system allocates the first terminal identifier in the foregoing implementation instances, or the terminal may obtain the first terminal identifier in another manner. For example, in a handover scenario, the terminal obtains, in a source cell through an air interface control plane reconfiguration message (for example, a RRC Connection Reconfiguration message in LTE), a first terminal identifier allocated by a target base station for the terminal, and after being handed over to a new cell in the target base station, the terminal initiates the air interface control plane connection request through the first terminal identifier. The following embodiment of this application describes an interaction processing procedure between the distributed unit and the centralized unit after the terminal initiates the control plane connection request, and mainly relates to a transmission manner of a message corresponding to the control plane connection request.

For ease of description, the following embodiment of this application describes the technical solution of this application through an example in which the terminal initiates the RRC connection request. However, it is apparent that the method described in the following embodiment of this application may also be applied to another air interface control plane connection processing procedure.

After the terminal initiates the RRC connection request, the distributed unit receives the RRC connection request, and then the distributed unit sends the RRC connection request to the centralized unit. There may be at least the following several specific transmission manners of the RRC connection request:

(1) transmitting through a control plane connection between the distributed unit and the centralized unit;

(2) transmitting through a dedicated user plane transmission path established for a cell accessed by the terminal; and (3) transmitting through a dedicated user plane transmission path established for the terminal.

The following separately describes specific implementation processes of the foregoing transmission manners in cases of different first terminal identifier allocation manners.

Figure 7:
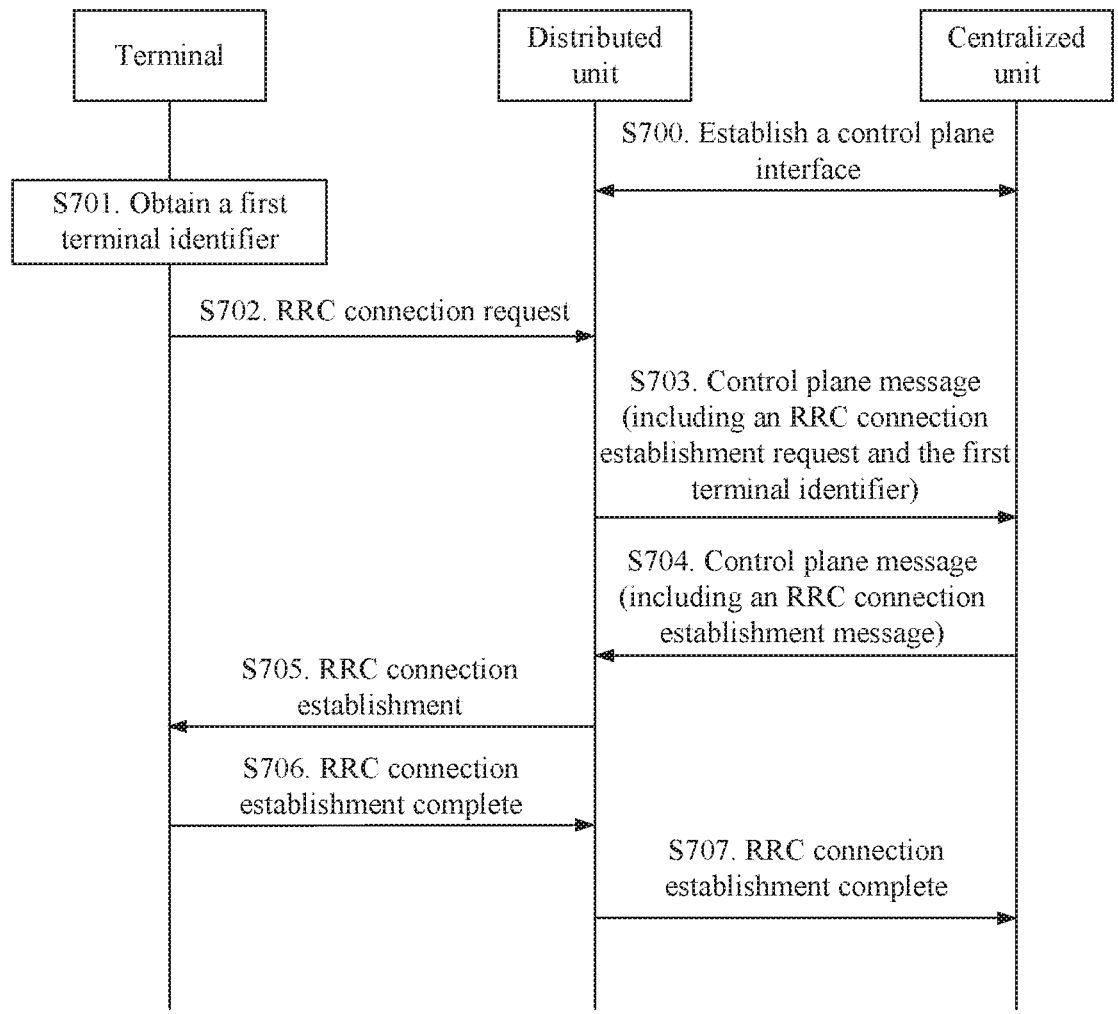
FIG. 7 is a schematic flowchart of a connection control method embodiment 4 according to this application.

FIG. 7 is a schematic flowchart of a wireless connection control method embodiment 4 according to this application. In this process, a RRC connection message is transmitted through a control plane connection between a distributed unit and a centralized unit. As shown in FIG. 7, the process includes the following steps.

S700. Establish a control plane interface between the distributed unit and the centralized unit.

S701. A terminal obtains a first terminal identifier.

Optionally, the terminal may obtain the first terminal identifier based on any one of the different manners in which the base station system allocates the first terminal identifier in the foregoing implementation instances, or the terminal may obtain the first terminal identifier in another manner. For example, in a handover scenario, the terminal obtains, in a source cell via an air interface control plane reconfiguration message (for example, a RRC Connection Reconfiguration message in LIE system), a first terminal identifier allocated by a target base station for the terminal, and after being handed over to a new cell in the target base station, the terminal initiates an air interface control plane connection request by using the first terminal identifier.

S702. The terminal sends a RRC connection request (a first message) to the distributed unit.

The first message is used to request to establish an air interface control plane connection for the terminal.

For a specific process, refer to the foregoing step S404. Details are not described herein again.

S703. The distributed unit sends the RRC connection request (the first message) to the centralized unit through the control plane connection.

Optionally, before step S703, the distributed unit pre-establishes the control plane connection between the distributed unit and the centralized unit. Correspondingly, in this step, the distributed unit sends the RRC connection request to the centralized unit through the pre-established control plane connection.

Specifically, the distributed unit sends a control plane message (referred to as a third message) to the centralized unit, where the third message includes the RRC connection request. Optionally, the RRC connection request may be carried into a container, and then the container is carried in the third message for sending.

Further, the third message may further include at least one of the following information:

a first terminal identifier corresponding to the terminal, an identifier of a cell accessed by the terminal, and a second terminal identifier corresponding to the terminal.

The first terminal identifier is used to identify the terminal on the air interface, and the second terminal identifier is an identifier allocated by the distributed unit for the terminal on a control plane interface between the distributed unit and the centralized unit.

Optionally, all of the foregoing three pieces of information may be sent in the third message, or some of the foregoing three pieces of information may be sent in the third message, and the others are sent through another control plane message, or all of the foregoing three pieces of information may be sent through another control plane message.

S704. The centralized unit sends a RRC connection establishment message (a second message) to the distributed unit.

The second message is used to instruct to establish the air interface control plane connection between the terminal and the distributed unit.

Corresponding to step S703. In this step, the centralized unit may send the second message through the pre-established control plane connection. Correspondingly, the distributed unit receives the second message on the control plane connection. In other words, the second message is a control plane message, and the second message may catty the RRC connection establishment message. Optionally, the RRC connection request may be added into a container, and then the container is carried in the second message for sending.

Further, the second message may further include a third terminal identifier.

The third terminal identifier is an identifier allocated by the centralized unit for the terminal on the control plane interface between the distributed unit and the centralized unit.

Optionally, the foregoing third terminal identifier may also be sent through another control plane message.

S705. The distributed unit sends the RRC connection establishment message to the terminal.

S706. The terminal sends a RRC connection establishment complete message to the distributed unit.

S707. The distributed unit sends the RRC connection establishment complete message to the centralized unit.

In the foregoing procedure, a sequence in which steps S700 and S701 occur is not limited. In other words, step S701 may occur before step S700.

In this embodiment, the distributed unit sends a control plane connection request through a control plane connection between the distributed unit and the centralized unit, and receives the RRC connection establishment message through a control plane between the distributed unit and the centralized unit, so that a message in a RRC connection process is sent based on a control plane message, thereby improving sending and receiving efficiency of the RRC connection message.

Further, in the foregoing process, the distributed unit may further configure a first signaling bearer. To be specific, the distributed unit may receive first signaling bearer configuration information sent by the centralized unit.

In this embodiment of this application, the first signaling bearer is a bearer used to transmit an air interface control plane connection message, and a relationship between the first signaling bearer and the following second signaling bearer and third signaling bearer is as follows: Air interface control plane connection messages are classified into a plurality of types. For example, there are three types in this application. The second signaling bearer is used to transmit an initial air interface control plane connection message (for example, the RRC connection request and the RRC connection establishment message). The first signaling bearer is used to transmit a subsequent air interface control plane connection message (for example, the RRC connection establishment complete message). The third signaling bearer is used to transmit another air interface control plane connection message and a non-access stratum message. Further optionally, a processing priority of the second signaling bearer is higher than that of the first signaling bearer, and the processing priority of the first signaling bearer is higher than that of the third signaling bearer.

The first signaling bearer configuration information includes at least one of the following information:

a first signaling bearer identifier, a Media Access Control layer configuration parameter used by the distributed unit to establish the first signaling bearer, a physical layer configuration parameter used by the distributed unit to establish the first signaling bearer, a logical channel configuration parameter used by the distributed unit to establish the first signaling bearer, and first signaling bearer user plane transmission path establishment information on a centralized unit side.

In an optional implementation, the first signaling bearer configuration information may be carried in the foregoing second message for sending. To be specific, when sending the second message to the distributed unit, the centralized unit includes the first signaling bearer configuration information into the second message, and sends the second message to the distributed unit.

In another optional implementation, the first signaling bearer configuration information may also be sent through another control plane message. For example, before sending the second message or after sending the second message, the centralized unit sends a control plane message to the distributed unit, where the control plane message carries the first signaling bearer configuration information.

Correspondingly, in the foregoing process, the distributed unit may further send first signaling bearer user plane transmission path establishment information on a distributed unit side to the centralized unit.

In an optional implementation, the first signaling bearer user plane transmission path establishment information on the distributed unit side may be carried in the foregoing third message for sending. To be specific, the distributed unit carries the first signaling bearer user plane transmission path establishment information on the distributed unit side into the third message, and sends the third message to the centralized unit.

In another optional implementation, the first signaling bearer user plane transmission path establishment information on the distributed unit side may also be sent through another control plane message. For example, before sending the third message or after sending the third message, the distributed unit sends a control plane message to the centralized unit, where the control plane message carries the first signaling bearer user plane transmission path establishment information on the distributed unit side.

Correspondingly, in the foregoing process, the distributed unit may further configure the third signaling bearer.

Specifically, the distributed unit may send user plane transmission path establishment information on a distributed unit side to the centralized unit through the control plane connection between the distributed unit and the centralized unit.

The user plane transmission path establishment information on the distributed unit side includes at least one of the following information: third signaling bearer user plane transmission path establishment information on the distributed unit side.

Correspondingly, the distributed unit receives, through the control plane connection between the distributed unit and the centralized unit, third signaling bearer configuration information sent by the centralized unit.

The third signaling bearer configuration information includes at least one of the following information: a Media Access Control layer configuration parameter used by the distributed unit to establish the third signaling bearer, a physical layer configuration parameter used by the distributed unit to establish the third signaling bearer, a logical channel configuration parameter used by the distributed unit to establish the third signaling bearer, and second signaling bearer user plane transmission path establishment information on a centralized unit side.

In an optional implementation, the user plane transmission path establishment information that is on the distributed unit side and that corresponds to the third signaling bearer may be sent together with the user plane transmission path establishment information that is on the distributed unit side and that corresponds to the first signaling bearer. For a specific sending manner, refer to the foregoing embodiment.

In another optional implementation, the user plane transmission path establishment information that is on the distributed unit side and that corresponds to the third signaling bearer may also be sent through another control plane message, for example, sent before or after the user plane transmission path establishment information that is on the distributed unit side and that corresponds to the first signaling bearer is sent.

Correspondingly, the third signaling bearer configuration information may also be sent together with the first signaling bearer configuration information, or may be sent through another control plane message.

Correspondingly, in the foregoing process, the distributed unit may further configure a data bearer.

Specifically, the centralized unit sends data bearer configuration information to the distributed unit. Correspondingly, the distributed unit sends at least one of the following information to the centralized unit: a data bearer identifier, and data bearer user plane transmission path establishment information on a distributed unit side.

The data bearer configuration information includes at least one of the following information: a data bearer identifier, a Media Access Control layer configuration parameter used by the distributed unit to establish the data bearer, a physical layer configuration parameter used by the distributed unit to establish the data bearer, a logical channel configuration parameter used by the distributed unit to establish the data bearer, service information used by the distributed unit to process the data bearer, and data bearer user plane transmission path establishment information on a centralized unit side.

In an optional implementation, the data bearer configuration information may be sent together with the third signaling bearer configuration information.

In another optional implementation, the data bearer configuration information may also be sent through another control plane message.

In an optional implementation, the data bearer user plane transmission path establishment information on the distributed unit side may be sent together with the data bearer user plane transmission path establishment information that is on the distributed unit side and that corresponds to the third signaling bearer.

In another optional implementation, the data bearer user plane transmission path establishment information on the distributed unit side may also be sent through another control plane message.

Figure 8:
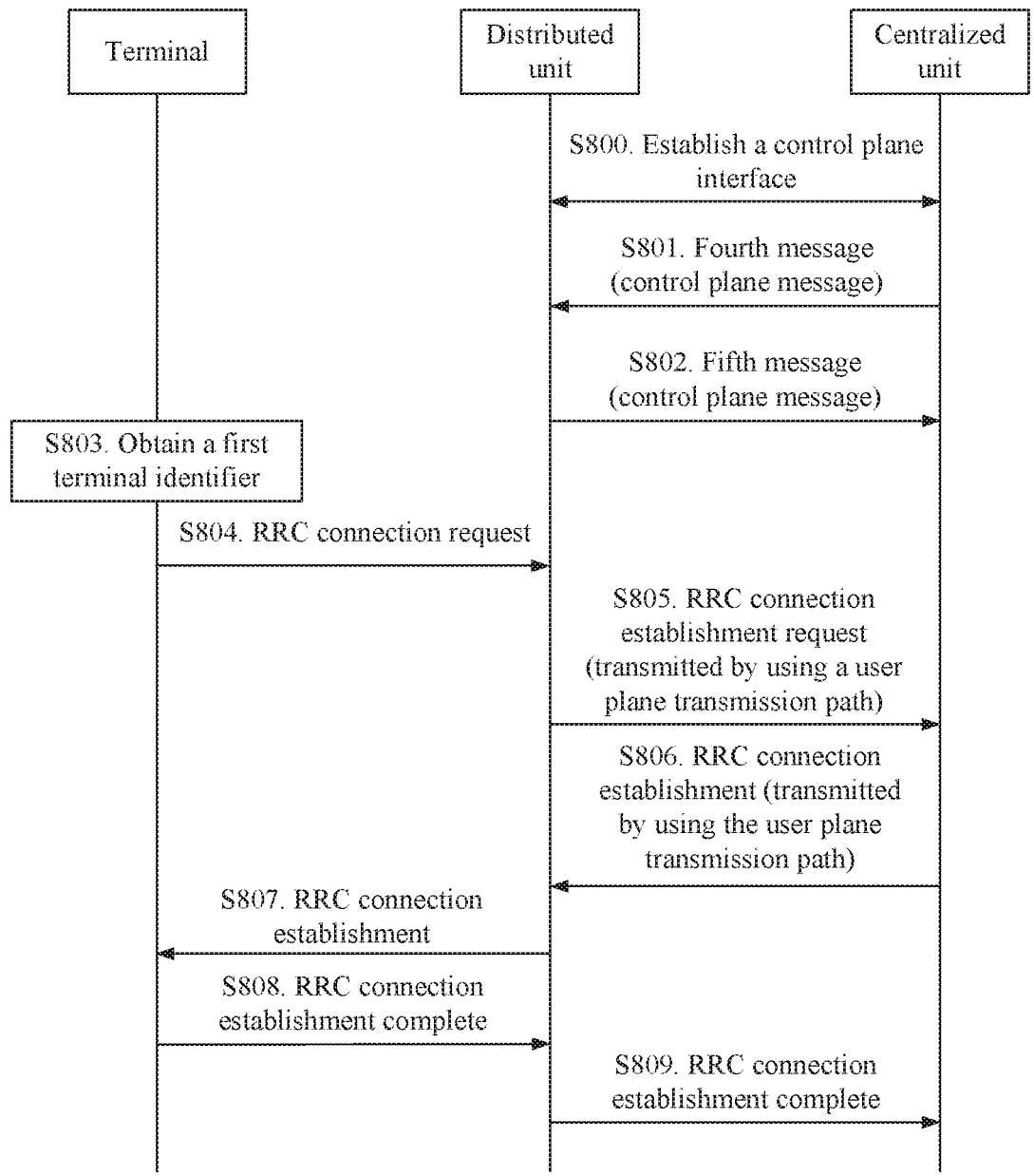
FIG. 8 is a schematic flowchart of a connection control method embodiment 5 according to this application.

In the foregoing embodiment, a user plane transmission path may be specifically a user plane tunnel. Correspondingly, the user plane transmission path establishment information may be specifically user plane tunnel establishment information. The user plane tunnel establishment information includes one or a combination of the following information: a tunnel identifier, a tunnel port number, a tunnel IP address, and a tunnel MAC address. For example, the user plane tunnel is established based on the GTP-U protocol. To establish the user plane tunnel between the distributed unit and the centralized unit, the centralized unit needs to notify the distributed unit of a tunnel identifier allocated for the tunnel on the centralized unit side. After obtaining an IP address (this address may be used for all user plane tunnels between the centralized unit and the distributed unit) of the centralized unit and the tunnel identifier allocated by the centralized unit for the tunnel, the distributed unit may send a corresponding user plane message to the centralized unit through the tunnel. Likewise, when sending the user plane message to the distributed unit through the user plane tunnel, the centralized unit needs to obtain in advance an address of the distributed unit and a tunnel identifier allocated by the distributed unit for the tunnel, FIG. 8 is a schematic flowchart of a wireless connection control method embodiment 5 according to this application. In this process, a RRC connection message is transmitted through a dedicated user plane transmission path for a cell accessed by the terminal. As shown in FIG. 8, the process includes the following steps.

S800. Establish a control plane interface between a distributed unit and a centralized unit.

S801. The centralized unit sends a fourth message to the distributed unit.

Specifically, the fourth message is a control plane message, and the fourth message includes at least one of the following information:

a cell identifier, second signaling bearer configuration information, and second signaling bearer user plane transmission path establishment information on a centralized unit side.

The second signaling bearer configuration information includes a second signaling bearer identifier. Optionally, the second signaling bearer configuration information may further include a corresponding physical layer configuration parameter, a media access control layer configuration parameter, and the like.

S802. The distributed unit sends a fifth message to the centralized unit.

Specifically, the fifth message is also a control plane message, and the fifth message includes at least one of the following information:

a cell identifier, a second signaling bearer identifier, and second signaling bearer user plane transmission path establishment information on a distributed unit side.

After steps S801 and S802, the dedicated user plane transmission path for the cell in the distributed unit is established.

Specifically, the dedicated user plane transmission path may be a user plane tunnel. For example, the tunnel may be established based on the GTP-U protocol or established based on another similar protocol.

S803. The terminal obtains a first terminal identifier.

Optionally, the terminal may obtain the first terminal identifier based on any one of the different manners in which the base station system allocates the first terminal identifier in the foregoing implementation instances, or the terminal may obtain the first terminal identifier in another manner. For example, in a handover scenario, the terminal obtains, in a source cell through an air interface control plane reconfiguration message (for example, a RRC Connection Reconfiguration message in LTE), a first terminal identifier allocated by a target base station for the terminal, and after being handed over to a new cell in the target base station, the terminal initiates an air interface control plane connection request through the first terminal identifier.

S804. The terminal sends a RRC connection request to the distributed unit.

For a specific process, refer to the foregoing step S404. Details are not described herein again.

S805. The distributed unit sends the RRC connection request (a first message) to the centralized unit.

Specifically, because the second signaling bearer user plane transmission path corresponding to the cell accessed by the terminal has been established in steps S801 and S802, in this step, the distributed unit directly sends the first message to the centralized unit through a user plane transmission path corresponding to the second signaling bearer user plane transmission path establishment information on the centralized unit side.

The distributed unit carries a cell identifier and/or a second terminal identifier into the first message when sending the first message to the centralized unit.

S806. The centralized unit sends a RRC connection establishment message (a second message) to the distributed unit.

Specifically, the distributed unit receives, through a user plane transmission path corresponding to the second signaling bearer user plane transmission path establishment information on the distributed unit side, the second message sent by the centralized unit.

The second message that is sent by the centralized unit and received by the distributed unit includes a cell identifier and/or a third terminal identifier.

S807. The distributed unit sends the RRC connection establishment message to the terminal.

S808. The terminal sends a RRC connection establishment complete message to the distributed unit.

S809. The distributed unit sends the RRC connection establishment complete message to the centralized unit.

Further, in the foregoing process, the distributed unit may further configure a first signaling bearer. To be specific, the distributed unit may receive first signaling bearer configuration information sent by the centralized unit.

In an optional implementation, the first signaling bearer configuration information may be carried in the foregoing fourth message for sending. To be specific, when sending the fourth message to the distributed unit, the centralized unit carries the first signaling bearer configuration information into the fourth message, and sends the fourth message to the distributed unit.

In another optional implementation, the first signaling bearer configuration information may also be sent through another control plane message. For example, before sending the fourth message or after sending the fourth message, the centralized unit sends a control plane message to the distributed unit, where the control plane message carries the first signaling bearer configuration information.

Correspondingly, in the foregoing process, the distributed unit may further send first signaling bearer user plane transmission path establishment information on a distributed unit side to the centralized unit.

In an optional implementation, the first signaling bearer user plane transmission path establishment information on the distributed unit side may be carried in the foregoing fifth message for sending. To be specific, the distributed unit carries the first signaling bearer user plane transmission path establishment information on the distributed unit side into the fifth message, and sends the fifth message to the centralized unit.

In another optional implementation, the first signaling bearer user plane transmission path establishment information on the distributed unit side may also be sent through another control plane message. For example, before sending the fifth message or after sending the fifth message, the distributed unit sends a control plane message to the centralized unit, where the control plane message carries the first signaling bearer user plane transmission path establishment information on the distributed unit side.

Optionally, in the foregoing process, the distributed unit may further configure a third signaling bearer.

Specifically, the distributed unit may send user plane transmission path establishment information on a distributed unit side to the centralized unit through a control plane connection between the distributed unit and the centralized unit.

The user plane transmission path establishment information on the distributed unit side includes at least one of the following information: a third signaling bearer identifier, and third signaling bearer user plane transmission path establishment information on the distributed unit side.

Correspondingly, the distributed unit receives, through the control plane connection between the distributed unit and the centralized unit, third signaling bearer configuration information sent by the centralized unit.

The third signaling bearer configuration information includes at least one of the following information: a third signaling bearer identifier, a Media Access Control layer configuration parameter used by the distributed unit to establish the third signaling bearer, a physical layer configuration parameter used by the distributed unit to establish the third signaling bearer, a logical channel configuration parameter used by the distributed unit to establish the third signaling bearer, and third signaling bearer user plane transmission path establishment information on a centralized unit side.

In an optional implementation, the user plane transmission path establishment information that is on the distributed unit side and that corresponds to the third signaling bearer may be sent together with the user plane transmission path establishment information that is on the distributed unit side and that corresponds to the first signaling bearer. For a specific sending manner, refer to the foregoing embodiment.

In another optional implementation, the user plane transmission path establishment information that is on the distributed unit side and that corresponds to the third signaling bearer may also be sent through another control plane message, for example, sent before or after the user plane transmission path establishment information that is on the distributed unit side and that corresponds to the first signaling bearer is sent.

Correspondingly, the third signaling bearer configuration information may also be sent together with the first signaling bearer configuration information, or may be sent through another control plane message.

Optionally, in the foregoing process, the distributed unit may further configure a data bearer.

Specifically, the centralized unit sends data bearer configuration information to the distributed unit. Correspondingly, the distributed unit sends at least one of the following information to the centralized unit: a data bearer identifier, and data bearer user plane transmission path establishment information on a distributed unit side.

The data bearer configuration information includes at least one of the following information: a data bearer identifier, a Media Access Control layer configuration parameter used by the distributed unit to establish the data bearer, a physical layer configuration parameter used by the distributed unit to establish the data bearer, a logical channel configuration parameter used by the distributed unit to establish the data bearer, service information used by the distributed unit to process the data bearer, and data bearer user plane transmission path establishment information on a centralized unit side.

In an optional implementation, the data bearer configuration information ay be sent together with the third signaling bearer configuration information.

In another optional implementation, the data bearer configuration information may also be sent through another control plane message.

In an optional implementation, the data bearer user plane transmission path establishment information on the distributed unit side may be sent together with the data bearer user plane transmission path establishment information that is on the distributed unit side and that corresponds to the third signaling bearer.

In another optional implementation, the data bearer user plane transmission path establishment information on the distributed unit side may also be sent through another control plane message.

Figure 9:
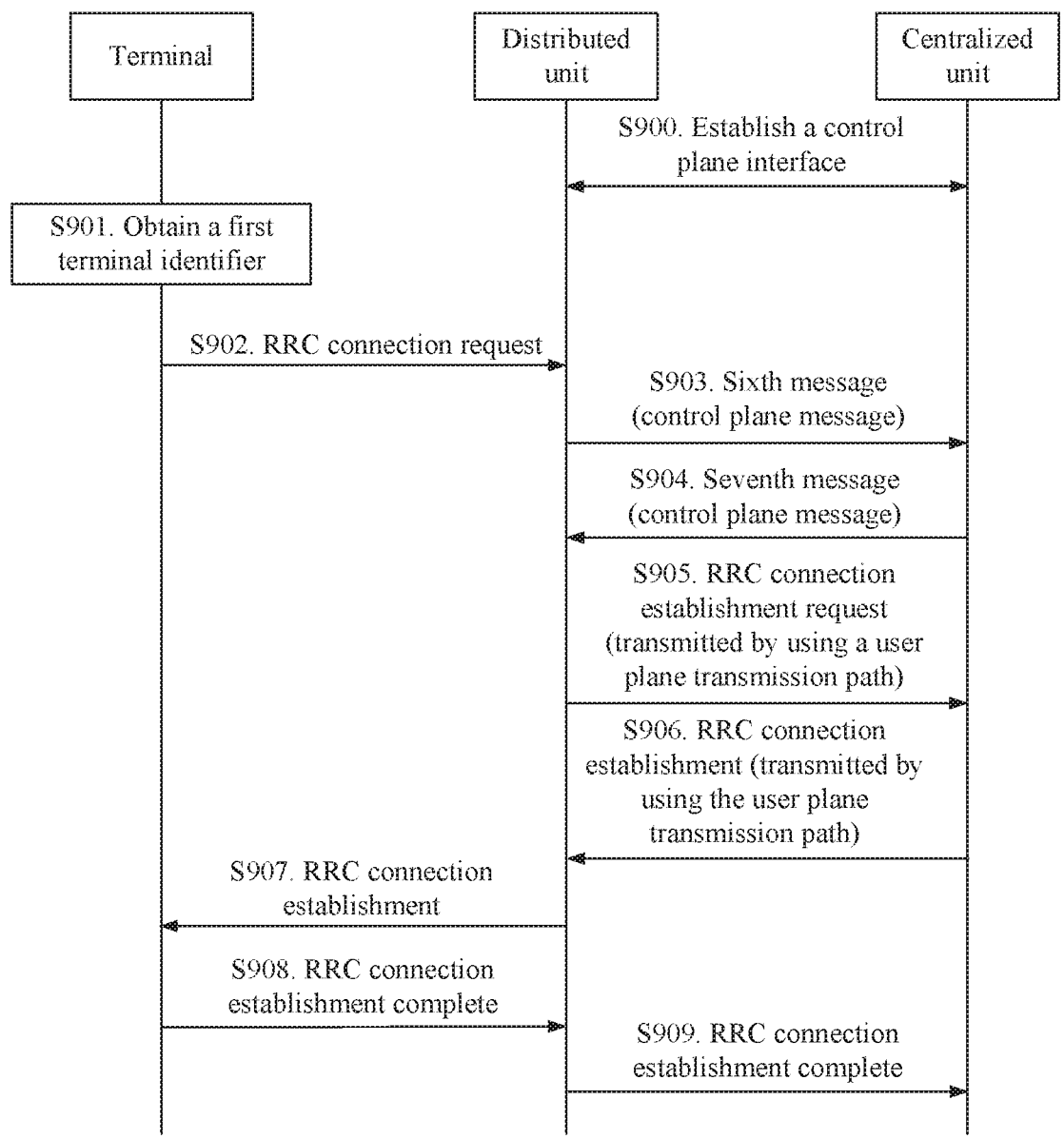
FIG. 9 is a schematic flowchart of a connection control method embodiment 6 according to this application.

FIG. 9 is a schematic flowchart of a wireless connection control method embodiment 6 according to this application. In this process, a RRC connection message is transmitted through a dedicated user plane transmission path for the terminal. As shown in FIG. 9, the process includes the following steps.

S900. Establish a control plane interface between a distributed unit and a centralized unit.

S901. The terminal obtains a first terminal identifier.

Optionally, the terminal may obtain the first terminal identifier based on any one of the different manners in which the base station system allocates the first terminal identifier in the foregoing implementation instances, or the terminal may obtain the first terminal identifier in another manner. For example, in a handover scenario, the terminal obtains, in a source cell through an air interface control plane reconfiguration message (for example, a RRC Connection Reconfiguration message in LTE), a first terminal identifier allocated by a target base station for the terminal, and after being handed over to a new cell in the target base station, the terminal initiates an air interface control plane connection request through the first terminal identifier.

S902. The terminal sends a RRC connection request to the distributed unit.

For a specific process, refer to the foregoing step S404. Details are not described herein again.

S903. The distributed unit sends a sixth message to the centralized unit.

The sixth message is a control plane message, and is used to request to establish, for the terminal, a user plane transmission path that is between the distributed unit and the centralized unit and that is of a second signaling bearer.

The sixth message includes at least one of the following information:

a first terminal identifier corresponding to the terminal, a second terminal identifier corresponding to the terminal, and an identifier of a cell accessed by the terminal.

In an optional implementation, the distributed unit may directly use the sixth message to indicate second signaling bearer user plane transmission path establishment information on a distributed unit side.

In another optional implementation, the distributed unit may carry the second signaling bearer user plane transmission path establishment information into the sixth message.

In another optional implementation, the distributed unit may also send the second signaling bearer user plane transmission path establishment information through another control plane message.

S904. The centralized unit sends a seventh message to the distributed unit.

The seventh message is a control plane message.

The seventh message includes a third terminal identifier and second signaling bearer user plane transmission path establishment information on a centralized unit side.

After steps S903 and S904 are performed, a second signaling bearer user plane transmission path for the terminal is established.

S905. The distributed unit sends a RRC connection establishment request (a first message) to the centralized unit.

Specifically, the second signaling bearer user plane transmission path for the terminal has been established in the foregoing step. Therefore, in this step, the distributed unit directly sends the first message to the centralized unit through a user plane transmission path corresponding to the second signaling bearer user plane transmission path establishment information on the centralized unit side.

S906. The centralized unit sends a RRC connection establishment message (a second message) to the distributed unit.

The distributed unit receives the second message on a user plane transmission path corresponding to the second signaling bearer user plane transmission path establishment information on the distributed unit side.

S907. The distributed unit sends the RRC connection establishment message to the terminal.

S908. The terminal sends a RRC connection establishment complete message to the distributed unit.

S909. The distributed unit sends the RRC connection establishment complete message to the centralized unit.

Optionally, in the foregoing process, the distributed unit may further configure a first signaling bearer. To be specific, the distributed unit may receive first signaling bearer configuration information sent by the centralized unit.

The first signaling bearer configuration information includes at least one of the following information: a first signaling bearer identifier, a Media Access Control layer configuration parameter used by the distributed unit to establish the first signaling bearer, a physical layer configuration parameter used by the distributed unit to establish the first signaling bearer, a logical channel configuration parameter used by the distributed unit to establish the first signaling bearer, and first signaling bearer user plane transmission path establishment information on a centralized unit side.

In an optional implementation, the first signaling bearer configuration information may be carried in the foregoing sixth message for sending. To be specific, when sending the sixth message to the distributed unit, the centralized unit carries the first signaling bearer configuration information into the sixth message, and sends the sixth message to the distributed unit.

In another optional implementation, the first signaling bearer configuration information may also be sent through another control plane message. For example, before sending the sixth message or after sending the sixth message, the centralized unit sends a control plane message to the distributed unit, where the control plane message carries the first signaling bearer configuration information.

Correspondingly, in the foregoing process, the distributed unit may further send user plane transmission path establishment information on a distributed unit side to the centralized unit.

The user plane transmission path establishment information on the distributed unit side includes at least one of the following information: a first signaling bearer identifier, and first signaling bearer user plane transmission path establishment information on the distributed unit side.

In an optional implementation, the first signaling bearer user plane transmission path establishment information on the distributed unit side may be carried in the foregoing seventh message for sending. To be specific, the distributed unit carries the first signaling bearer user plane transmission path establishment information on the distributed unit side into the seventh message, and sends the seventh message to the centralized unit.

In another optional implementation, the first signaling bearer user plane transmission path establishment information on the distributed unit side may also be sent through another control plane message. For example, before sending the seventh message or after sending the seventh message, the distributed unit sends a control plane message to the centralized unit, where the control plane message carries the first signaling bearer user plane transmission path establishment information on the distributed unit side.

Optionally, in the foregoing process, the distributed unit may further configure a third signaling bearer.

Specifically, the distributed unit may send user plane transmission path establishment information on a distributed unit side to the centralized unit through a control plane connection between the distributed unit and the centralized unit.

The user plane transmission path establishment information on the distributed unit side includes at least one of the following information: a third signaling bearer identifier, and third signaling bearer user plane transmission path establishment information on the distributed unit side.

Correspondingly, the distributed unit receives, through the control plane connection between the distributed unit and the centralized unit, third signaling bearer configuration information sent by the centralized unit.

The third signaling bearer configuration information includes at least one of the following information: a third signaling bearer identifier, a Media Access Control layer configuration parameter used by the distributed unit to establish the third signaling bearer, a physical layer configuration parameter used by the distributed unit to establish the third signaling bearer, a logical channel configuration parameter used by the distributed unit to establish the third signaling bearer, and third signaling bearer user plane transmission path establishment information on a centralized unit side.

In an optional implementation, the user plane transmission path establishment information that is on the distributed unit side and that corresponds to the third signaling bearer may be sent together with the user plane transmission path establishment information that is on the distributed unit side and that corresponds to the first signaling bearer. For a specific sending manner, refer to the foregoing embodiment.

In another optional implementation, the user plane transmission path establishment information that is on the distributed unit side and that corresponds to the third signaling bearer may also be sent through another control plane message, for example, sent before or after the user plane transmission path establishment information that is on the distributed unit side and that corresponds to the first signaling bearer is sent.

Correspondingly, the third signaling bearer configuration information may also be sent together with the first signaling bearer configuration information, or may be sent through another control plane message.

Optionally, in the foregoing process, the distributed unit may further configure a data bearer.

Specifically, the centralized unit sends data bearer configuration information to the distributed unit. Correspondingly, the distributed unit sends data bearer user plane transmission path establishment information on the distributed unit side to the centralized unit.

The data bearer configuration information includes at least one of the following information: a data bearer identifier, a Media Access Control layer configuration parameter used by the distributed unit to establish a data bearer, a physical layer configuration parameter used by the distributed unit to establish the data bearer, a logical channel configuration parameter used by the distributed unit to establish the data bearer, service information used by the distributed unit to process the data bearer, and data bearer user plane transmission path establishment information on a centralized unit side.

In an optional implementation, the data bearer configuration information ay be sent together with the third signaling bearer configuration information.

In another optional implementation, the data bearer configuration information may also be sent through another control plane message.

In an optional implementation, the data bearer user plane transmission path establishment information on the distributed unit side may be sent together with the data bearer user plane transmission path establishment information that is on the distributed unit side and that corresponds to the third signaling bearer.

In another optional implementation, the data bearer user plane transmission path establishment information on the distributed unit side may also be sent through another control plane message.

In the embodiments corresponding to FIG. 7 to FIG. 9, the distributed unit cannot process the RRC layer message. Therefore, the distributed unit sends the first message to the centralized unit, and the centralized unit performs the processing. However, in another optional implementation, the distributed unit can process the RRC layer message, and the distributed unit may send only the identifier corresponding to the terminal to the centralized unit, and does not need to send the first message. Details are described below.

Figure 10:
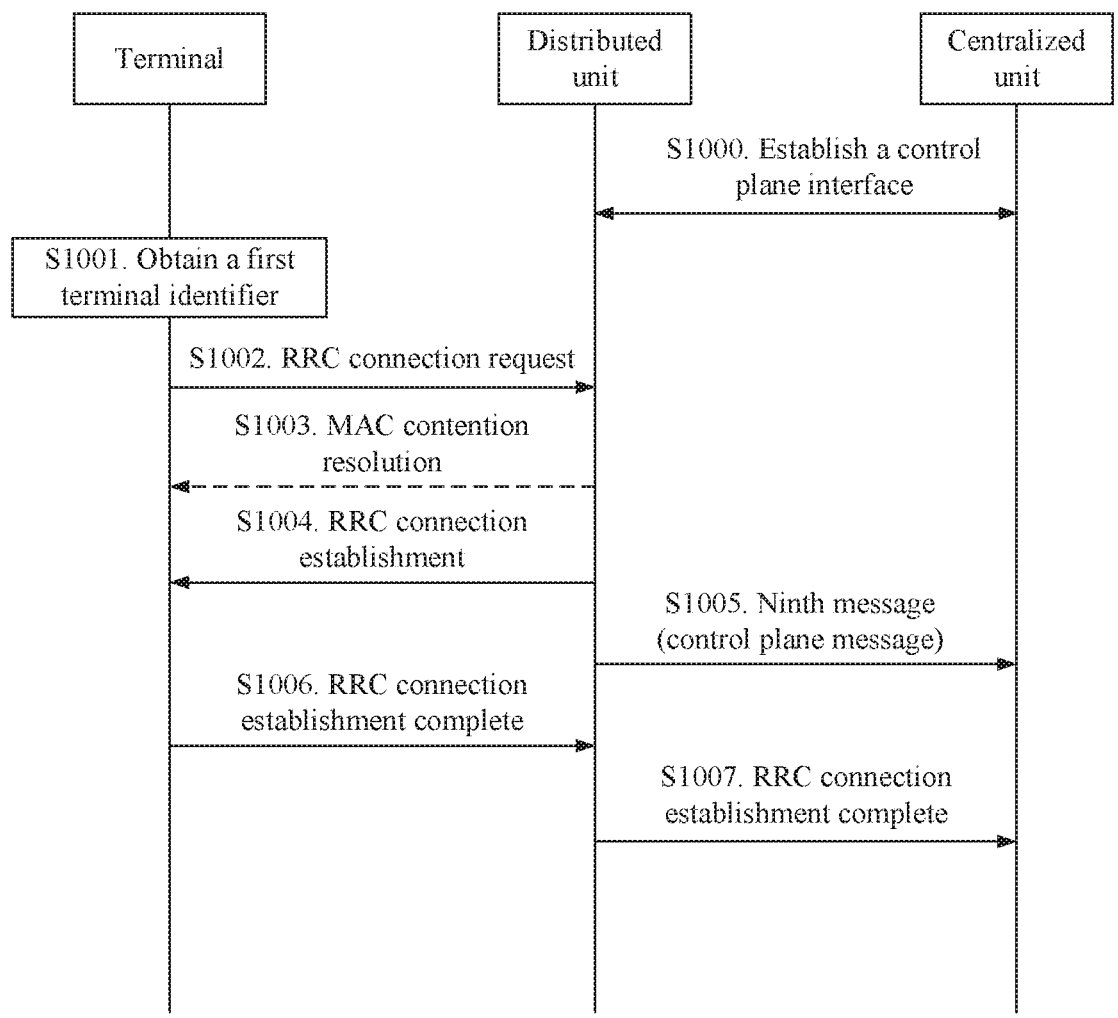
FIG. 10 is a schematic flowchart of a connection control method embodiment 7 according to this application.

FIG. 10 is a schematic flowchart of a wireless connection control method embodiment 7 according to this application. In this process, a distributed unit can process a RRC layer message. As shown in FIG. 10, the process includes the following steps.

S1000. Establish a control plane interface between the distributed unit and a centralized unit.

S1001. A terminal obtains a first terminal identifier.

Optionally, the terminal may obtain the first terminal identifier based on any one of the different manners in which the base station system allocates the first terminal identifier in the foregoing implementation instances, or the terminal may obtain the first terminal identifier in another manner. For example, in a handover scenario, the terminal obtains, in a source cell through an air interface control plane reconfiguration message (for example, a RRC Connection Reconfiguration message in LTE), a first terminal identifier allocated by a target base station for the terminal, and after being handed over to a new cell in the target base station, the terminal initiates an air interface control plane connection request through the first terminal identifier.

S1002. The terminal sends a RRC connection request to the distributed unit.

S1003. Optionally, the distributed unit uses a MAC message to indicate terminal contention resolution.

S1004. The distributed unit sends a RRC connection establishment message to the terminal.

S1005. The distributed unit sends a ninth message to the centralized unit.

The ninth message includes a connection parameter used to establish an air interface control plane connection.

Optionally, the connection parameter used to establish the air interface control plane connection includes at least one of the following information: a fourth terminal identifier corresponding to the terminal, and a terminal control plane connection establishment cause, where the fourth terminal identifier is a terminal identifier allocated by a core network, or the fourth terminal identifier is a random number.

S1006. The terminal sends a RRC connection establishment complete message to the distributed unit.

S1007. The distributed unit sends the RRC connection establishment complete message to the centralized unit.

Further, in the foregoing process, the distributed unit may further configure a first signaling bearer. To be specific, the distributed unit may receive first signaling bearer configuration information sent by the centralized unit.

In an optional implementation, the first signaling bearer configuration information may be carried in the foregoing ninth message for sending. To be specific, when sending the ninth message to the distributed unit, the centralized unit carries the first signaling bearer configuration information into the ninth message, and sends the ninth message to the distributed unit.

In another optional implementation, the first signaling bearer configuration information may also be sent through another control plane message. For example, before sending the ninth message or after sending the ninth message, the centralized unit sends a control plane message to the distributed unit, where the control plane message carries the first signaling bearer configuration information.

Correspondingly, in the foregoing process, the distributed unit may further send first signaling bearer user plane transmission path establishment information on a distributed unit side to the centralized unit.

The first signaling bearer user plane transmission path establishment information on the distributed unit side may be sent through a control plane message. For example, before sending the ninth message or after sending the ninth message, the distributed unit sends a control plane message to the centralized unit, where the control plane message carries the first signaling bearer user plane transmission path establishment information on the distributed unit side.

Optionally, in the foregoing process, the distributed unit may further configure a third signaling bearer.

Specifically, the distributed unit may send user plane transmission path establishment information on the distributed unit side to the centralized unit through a control plane connection between the distributed unit and the centralized unit.

The user plane transmission path establishment information on the distributed unit side includes at least one of the following information: a third signaling bearer identifier, and third signaling bearer user plane transmission path establishment information on the distributed unit side.

Correspondingly, the distributed unit receives, through the control plane connection between the distributed unit and the centralized unit, third signaling bearer configuration information sent by the centralized unit.

The third signaling bearer configuration information includes at least one of the following information: a third signaling bearer identifier, a Media Access Control layer configuration parameter used by the distributed unit to establish the third signaling bearer, a physical layer configuration parameter used by the distributed unit to establish the third signaling bearer, a logical channel configuration parameter used by the distributed unit to establish the third signaling bearer, and third signaling bearer user plane transmission path establishment information on a centralized unit side.

In an optional implementation, the user plane transmission path establishment information that is on the distributed unit side and that corresponds to the third signaling bearer may be sent together with the user plane transmission path establishment information that is on the distributed unit side and that corresponds to the first signaling bearer. For a specific sending manner, refer to the foregoing embodiment.

In another optional implementation, the user plane transmission path establishment information that is on the distributed unit side and that corresponds to the third signaling bearer may also be sent through another control plane message, for example, sent before or after the user plane transmission path establishment information that is on the distributed unit side and that corresponds to the first signaling bearer is sent.

Correspondingly, the third signaling bearer configuration information may also be sent together with the first signaling bearer configuration information, or may be sent through another control plane message.

Optionally, in the foregoing process, the distributed unit may further configure a data bearer.

Specifically, the centralized unit sends data bearer configuration information to the distributed unit. Correspondingly, the distributed unit sends data bearer user plane transmission path establishment information on the distributed unit side to the centralized unit.

The data bearer configuration information includes at least one of the following information: a data bearer identifier, a Media Access Control layer configuration parameter used by the distributed unit to establish the data bearer, a physical layer configuration parameter used by the distributed unit to establish the data bearer, a logical channel configuration parameter used by the distributed unit to establish the data bearer, service information used by the distributed unit to process the data bearer, and data bearer user plane transmission path establishment information on the centralized unit side.

In an optional implementation, the data bearer configuration information may be sent together with the third signaling bearer configuration information.

In another optional implementation, the data bearer configuration information may also be sent through another control plane message.

In an optional implementation, the data bearer user plane transmission path establishment information on the distributed unit side may be sent together with the data bearer user plane transmission path establishment information that is on the distributed unit side and that corresponds to the third signaling bearer.

In another optional implementation, the data bearer user plane transmission path establishment information on the distributed unit side may also be sent through another control plane message.

Figure 11:
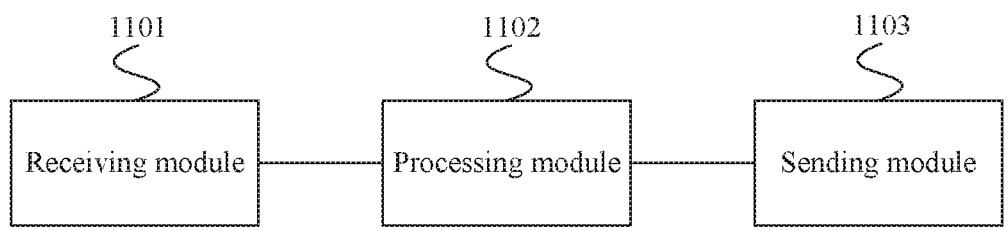
FIG. 11 is a modular structural diagram of an embodiment of a distributed unit according to this application.

FIG. 11 is a modular structural diagram of an embodiment of a distributed unit according to this application. As shown in FIG. 11, the distributed unit includes a receiving module 1101, a processing module 1102, and a sending module 1103.

The receiving module 1101 is configured to receive a first message sent by a terminal, where the first message is used to request to establish an air interface control plane connection for the terminal.

The processing module 1102 is configured to process the first message.

The sending module 1103 is configured to send the first message to a centralized unit.

The receiving module 1101 is further configured to receive a second message sent by the centralized unit, where the second message is used to instruct to establish the air interface control plane connection between the terminal and the distributed unit.

The distributed unit is configured to implement the foregoing method embodiments, implementation principles and technical effects are similar, and details are not described herein again.

Further, the processing module is further configured to establish a control plane connection between the distributed unit and the centralized unit.

Correspondingly, the sending module 1103 is specifically configured to:

send a third message to the centralized unit through the control plane connection, where the third message includes the first message, and the third message further includes at least one of the following information:

a first terminal identifier corresponding to the terminal, an identifier of a cell accessed by the terminal, and a second terminal identifier corresponding to the terminal, where the first terminal identifier is used to identify the terminal on the air interface, and the second terminal identifier is an identifier allocated by the distributed unit for the terminal on a control plane interface between the distributed unit and the centralized unit.

Further, the second message is transmitted through the control plane connection; the second message includes a third terminal identifier; and the third terminal identifier is an identifier allocated by the centralized unit for the terminal on the control plane interface between the distributed unit and the centralized unit.

Further, the receiving module 1101 is further configured to receive first signaling bearer configuration information sent by the centralized unit.

Further, the first signaling bearer configuration information includes at least one of the following information:

a first signaling bearer identifier, a Media Access Control layer configuration parameter used by the distributed unit to establish a first signaling bearer, a physical layer configuration parameter used by the distributed unit to establish the first signaling bearer, a logical channel configuration parameter used by the distributed unit to establish the first signaling bearer, and first signaling bearer user plane transmission path establishment information on a centralized unit side.

Further, the receiving module 1101 is specifically configured to:

receive, through the second message, the first signaling bearer configuration information sent by the centralized unit.

Further, the sending module 1103 is further configured to:

send first signaling bearer user plane transmission path establishment information on a distributed unit side to the centralized unit.

Further, the sending module 1103 is specifically configured to:

Include the first signaling bearer user plane transmission path establishment information on the distributed unit side into the third message, and send the third message to the centralized unit.

Further, the receiving module 1101 is further configured to:

receive a fourth message sent by the centralized unit, where the fourth message includes al least one of the following information: a cell identifier, second signaling bearer configuration information, and second signaling bearer user plane transmission path establishment information on the centralized unit side.

The sending module 1103 is further configured to:

send a fifth message to the centralized unit, where the fifth message includes at least one of the following information: a cell identifier, a second signaling bearer identifier, and second signaling bearer user plane transmission path establishment information on the distributed unit side.

Further, the sending module 1103 is specifically configured to:

send the first message to the centralized unit through a user plane transmission path corresponding to the second signaling bearer user plane transmission path establishment information on the centralized unit side.

The sending module 1103 carries the cell identifier and/or the second terminal identifier into the first message when sending the first message to the centralized unit.

Further, the receiving module 1101 is specifically configured to:

receive, through a user plane transmission path corresponding to the second signaling bearer user plane transmission path establishment information on the distributed unit side, the second message sent by the centralized unit.

The receiving module 1101 receives the cell identifier and/or the third terminal identifier that are/is included in the second message sent by the centralized unit.

Figure 12:
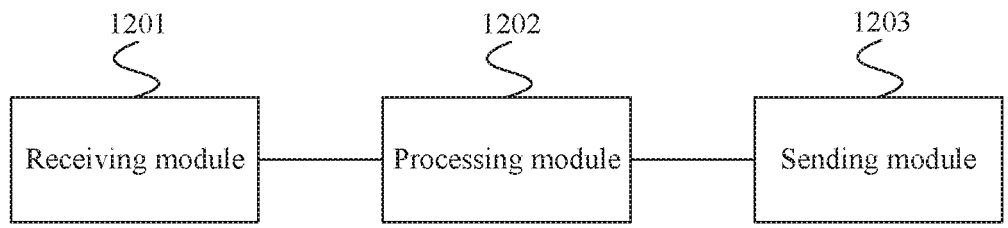
FIG. 12 is a modular structural diagram of an embodiment of another distributed unit according to this application.

FIG. 12 is a modular structural diagram of an embodiment of another distributed unit according to this application. As shown in FIG. 11, the distributed unit includes a receiving module 1201, a processing module 1202, and a sending module 1203.

The receiving module 1201 is configured to receive a first message sent by a terminal, where the first message is used to request to establish an air interface control plane connection for the terminal.

The processing module 1202 is configured to send an eighth message to the terminal based on the first message, where the eighth message is used to instruct to establish the air interface control plane connection for the terminal.

The sending module 1203 is configured to send a ninth message to the centralized unit, where the ninth message includes a connection parameter used to establish the air interface control plane connection.

The distributed unit is configured to implement the foregoing method embodiments. Implementation principles and technical effects are similar, and details are not described herein again.

Further, the connection parameter used to establish the air interface control plane connection includes at least one of the following information: a fourth terminal identifier corresponding to the terminal, and a terminal control plane connection establishment cause, where the fourth terminal identifier is a terminal identifier allocated by a core network, or the fourth terminal identifier is a random number.

Figure 13:
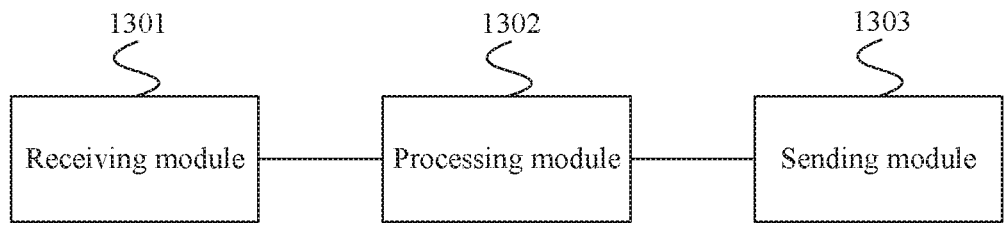
FIG. 13 is a modular structural diagram of an embodiment of still another distributed unit according to this application.

FIG. 13 is a modular structural diagram of an embodiment of still another distributed unit according to this application. As shown in FIG. 13, the distributed unit includes a receiving module 1301, a processing module 1302, and a sending module 1303.

The receiving module 1301 is configured to receive an access request message sent by a terminal.

The processing module 1302 is configured to obtain, based on the access request message, a first terminal identifier corresponding to the terminal, where the first terminal identifier is used to identify the terminal on an air interface.

The sending module 1303 is configured to send the first terminal identifier to the terminal.

The sending module 1303 is further configured to send the first terminal identifier and/or a cell identifier to a centralized unit.

Further, the first terminal identifier is allocated by the distributed unit.

Further, the sending module 1303 is further configured to:

send a first request message to the centralized unit, where the first request message is used to request the centralized unit to allocate a terminal identifier set.

The receiving module 1301 is further configured to:

receive the terminal identifier set sent by the centralized unit, where the terminal identifier set includes the first terminal identifier.

Figure 14:
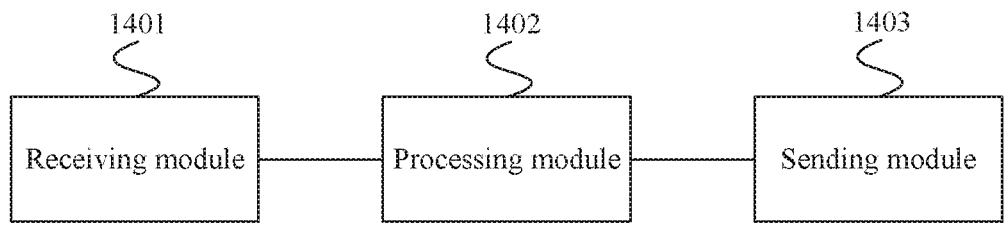
FIG. 14 is a modular structural diagram of an embodiment of yet another distributed unit according to this application.

FIG. 14 is a modular structural diagram of an embodiment of yet another distributed unit according to this application. As shown in FIG. 14, the distributed unit includes a receiving module 1401, a processing module 1402, and a sending module 1403.

The receiving module 1401 is configured to receive an access request message sent by a terminal.

The processing module 1402 is configured to send a second request message to a centralized unit based on the access request message, where the second request message is used to request the centralized unit to allocate a first terminal identifier for the terminal.

The receiving module 1401 is further configured to receive the first terminal identifier sent by the centralized unit.

The sending module 1403 is configured to send the first terminal identifier to the terminal.

Further, the second request message includes a cell identifier corresponding to a cell accessed by the terminal.

Further, the first terminal identifier is a unique identifier of a wireless network.

Figure 15:
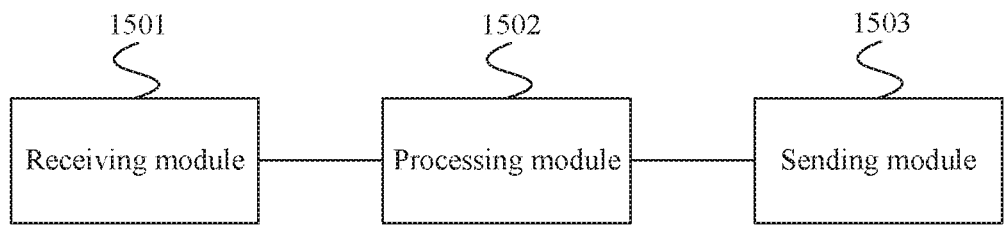
FIG. 15 is a modular structural diagram of an embodiment of a centralized unit according to this application.

FIG. 15 is a modular structural diagram of an embodiment of a centralized unit according to this application. As shown in FIG. 15, the centralized unit includes a receiving module 1501, a processing module 1502, and a sending module 1503.

The receiving module 1501 is configured to receive a first message sent by a distributed unit, where the first message is used to request to establish an air interface control plane connection for the terminal.

The processing module 1502 is configured to generate a second message based on the first message.

The sending module 1503 is configured to send the second message to the distributed unit, where the second message is used to instruct to establish the air interface control plane connection between the terminal and the distributed unit.

Further, the first message is included in a third message for transmission, and the third message is transmitted through a control plane connection between the distributed unit and the centralized unit; and the third message further includes at least one of the following information:

a first terminal identifier corresponding to the terminal, an identifier of a cell accessed by the terminal, and a second terminal identifier corresponding to the terminal, where the first terminal identifier is used to identify the terminal on the air interface, and the second terminal identifier is an identifier allocated by the distributed unit for the terminal on a control plane interface between the distributed unit and the centralized unit.

Further, the second message is transmitted through the control plane connection; correspondingly, the second message includes a third terminal identifier; and the third terminal identifier is an identifier allocated by the centralized unit for the terminal on the control plane interface between the distributed unit and the centralized unit.

Further, the sending module 1503 is further configured to:

send first signaling bearer configuration information to the distributed unit.

Further, the first signaling bearer configuration information includes at least one of the following information:

a first signaling bearer identifier, a Media Access Control layer configuration parameter used by the distributed unit to establish a first signaling bearer, a physical layer configuration parameter used by the distributed unit to establish the first signaling bearer, a logical channel configuration parameter used by the distributed unit to establish the first signaling bearer, and first signaling bearer user plane transmission path establishment information on a centralized unit side.

Further, the sending module 1503 sends the first signaling bearer configuration information through the second message.

Further, the receiving module 1501 is further configured to receive first signaling bearer user plane transmission path establishment information that is on a distributed unit side and that is sent by the distributed unit.

Further, the receiving module 1501 is specifically configured to:

receive the first signaling bearer user plane transmission path establishment information on the distributed unit side through the third message.

Further, the sending module 1503 is further configured to:

send a fourth message to the distributed unit, where the fourth message includes at least one of the following information: a cell identifier, second signaling bearer configuration information, and second signaling bearer user plane transmission path establishment information on the centralized unit side.

The receiving module 1501 is further configured to:

receive a fifth message sent by the distributed unit, where the fifth message includes at least one of the following information: a cell identifier, a second signaling bearer identifier, and second signaling bearer user plane transmission path establishment information on the distributed unit side.

Further, the receiving module 1501 is specifically configured to:

receive the first message on a user plane transmission path corresponding to the second signaling bearer user plane transmission path establishment information on the centralized unit side.

Further, the sending module 1503 is specifically configured to:

send the second message to the distributed unit through a user plane transmission path corresponding to the second signaling bearer user plane transmission path establishment information on the distributed unit side.

Figure 16:
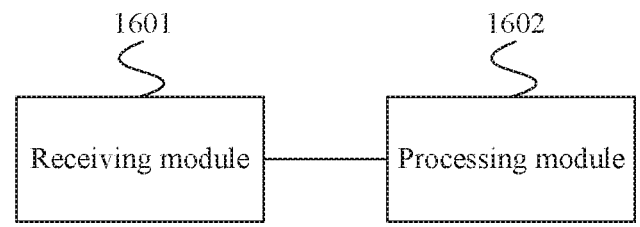
FIG. 16 is a modular structural diagram of an embodiment of another centralized unit according to this application.

FIG. 16 is a modular structural diagram of an embodiment of another centralized unit according to this application. As shown in FIG. 16, the centralized unit includes a receiving module 1601 and a processing module 1602.

The receiving module 1601 is configured to receive a ninth message sent by the distributed unit, where the ninth message includes a connection parameter used to establish an air interface control plane connection.

The processing module 1602 is configured to perform connection control processing based on the connection parameter used to establish the air interface control plane connection.

Further, the connection parameter used to establish the air interface control plane connection includes at least one of the following information: a fourth terminal identifier corresponding to the terminal, and a terminal control plane connection establishment cause, where the fourth terminal identifier is a terminal identifier allocated by a core network, or the fourth terminal identifier is a random number.

Figure 17:
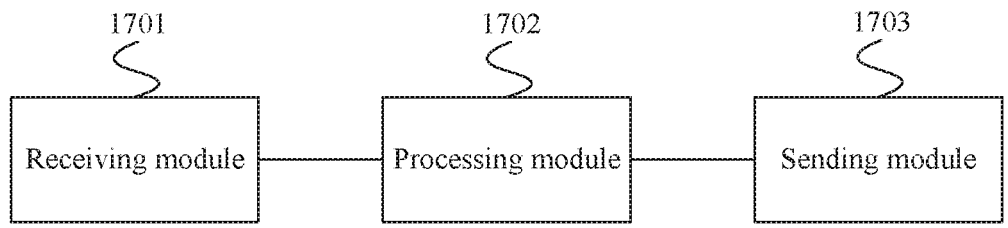
FIG. 17 is a modular structural diagram of an embodiment of still another centralized unit according to this application.

FIG. 17 is a modular structural diagram of an embodiment of still another centralized unit according to this application. As shown in FIG. 17, the centralized unit includes a receiving module 1701 and a processing module 1702.

The receiving module 1701 is configured to receive a first terminal identifier and/or a cell identifier that are/is sent by a distributed unit, where the first terminal identifier is used to identify a terminal on an air interface.

The processing module 1702 is configured to perform connection control processing based on the first terminal identifier.

Further, the first terminal identifier is allocated by the distributed unit.

Further, the receiving module 1701 is further configured to:

receive a first request message sent by the distributed unit, where the first request message is used to request the centralized unit to allocate a terminal identifier set.

The processing module 1702 is further configured to:

allocate the terminal identifier set.

The centralized unit further includes:

a sending module 1703, configured to send the terminal identifier set to the distributed unit, where the terminal identifier set includes the first terminal identifier.

Figure 18:
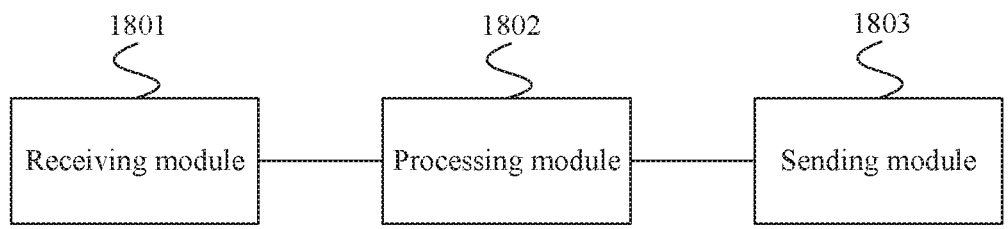
FIG. 18 is a modular structural diagram of an embodiment of yet another centralized unit according to this application.

FIG. 18 is a modular structural diagram of an embodiment of yet another centralized unit according to this application. As shown in FIG. 18, the centralized unit includes a receiving module 1801, a processing module 1802 and a sending module 1803.

The receiving module 1801 is configured to receive a second request message sent by a distributed unit, where the second request message is used to request the centralized unit to allocate a first terminal identifier for a terminal.

The processing module 1802 is configured to allocate the first terminal identifier for the terminal.

The sending module 1803 is configured to send the first terminal identifier to the distributed unit.

Further, the second request message includes a cell identifier corresponding to a cell accessed by the terminal.

Further, the first terminal identifier is a unique identifier of a wireless network.

Figure 19:
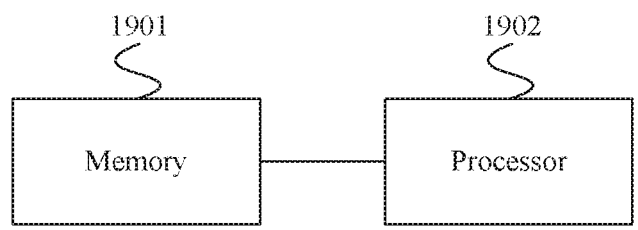
FIG. 19 is an entity block diagram of an embodiment of a distributed unit according to this application.

FIG. 19 is an entity block diagram of an embodiment of a distributed unit according to this application. As shown in FIG. 19, the distributed unit includes:

a memory 1901 and a processor 1902.

The memory 1901 is configured to store a program instruction, and the processor 1902 is configured to invoke the program instruction in the memory 1901, to implement functions of the distributed unit in the foregoing method embodiments 4, 5, and 6.

Figure 20:
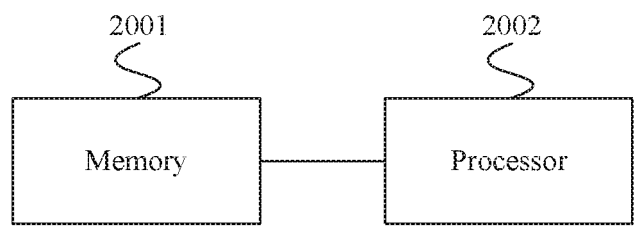
FIG. 20 is an entity block diagram of an embodiment of another distributed unit according to this application.

FIG. 20 is an entity block diagram of an embodiment of another distributed unit according to this application. As shown in FIG. 20, the distributed unit includes:

a memory 2001 and a processor 2002.

The memory 2001 is configured to store a program instruction, and the processor 2002 is configured to invoke the program instruction in the memory 2001, to implement functions of the distributed unit in the foregoing method embodiment 7.

Figure 21:
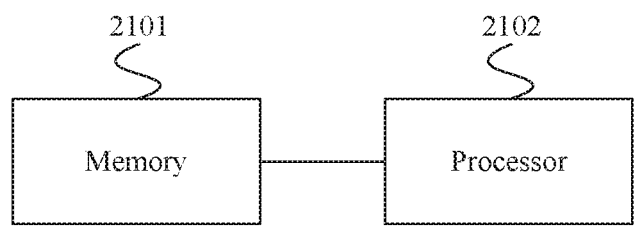
FIG. 21 is an entity block diagram of an embodiment of still another distributed unit according to this application.

FIG. 21 is an entity block diagram of an embodiment of still another distributed unit according to this application. As shown in FIG. 21, the distributed unit includes:

a memory 2101 and a processor 2102.

The memory 2101 is configured to store a program instruction, and the processor 2102 is configured to invoke the program instruction in the memory 2101, to implement functions of the distributed unit in the foregoing method embodiments 1 and 2.

Figure 22:
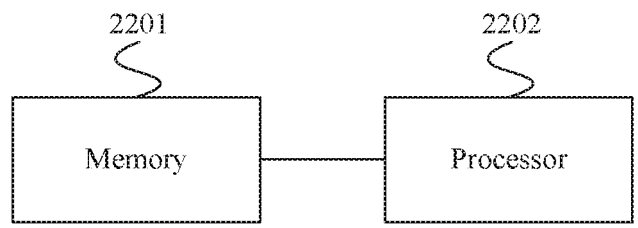
FIG. 22 is an entity block diagram of an embodiment of yet another distributed unit according to this application.

FIG. 22 is an entity block diagram of an embodiment of yet another distributed unit according to this application. As shown in FIG. 22, the distributed unit includes:

a memory 2201 and a processor 2202.

The memory 2201 is configured to store a program instruction, and the processor 2202 is configured to invoke the program instruction in the memory 2201, to implement functions of the distributed unit in the foregoing method embodiment 3.

Figure 23:
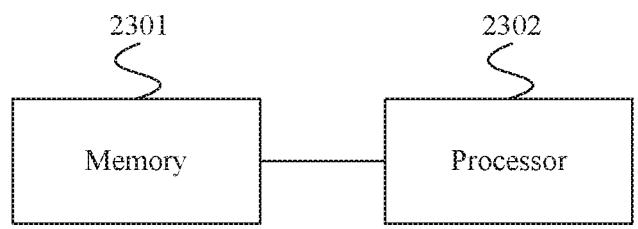
FIG. 23 is an entity block diagram of an embodiment of a centralized unit according to this application.

FIG. 23 is an entity block diagram of an embodiment of a centralized unit according to this application. As shown in FIG. 23, the centralized unit includes:

a memory 2301 and a processor 2302.

The memory 2301 is configured to store a program instruction, and the processor 2302 is configured to invoke the program instruction in the memory 2301, to implement functions of the centralized unit in the foregoing method embodiments 4, 5, and 6.

Figure 24:
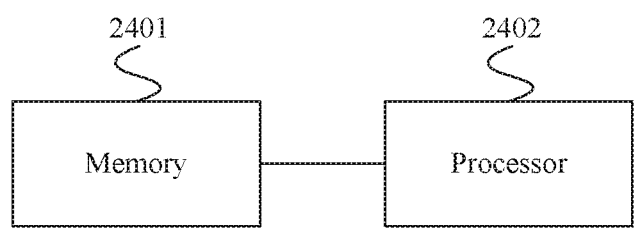
FIG. 24 is an entity block diagram of an embodiment of another centralized unit according to this application.

FIG. 24 is an entity block diagram of an embodiment of another centralized unit according to this application. As shown in FIG. 24, the centralized unit includes:

a memory 2401 and a processor 2402.

The memory 2401 is configured to store a program instruction, and the processor 2402 is configured to invoke the program instruction in the memory 2401, to implement functions of the centralized unit in the foregoing method embodiment 7.

Figure 25:
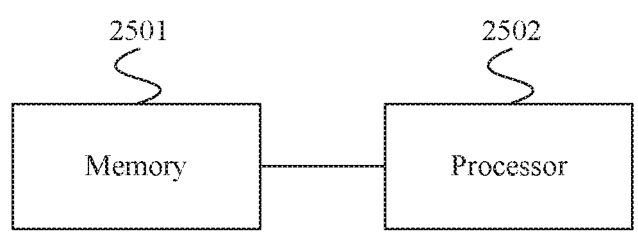
FIG. 25 is an entity block diagram of an embodiment of still another centralized unit according to this application.

FIG. 25 is an entity block diagram of an embodiment of still another centralized unit according to this application. As shown in FIG. 25, the centralized unit includes:

a memory 2501 and a processor 2502.

The memory 2501 is configured to store a program instruction, and the processor 2502 is configured to invoke the program instruction in the memory 2501, to implement functions of the centralized unit in the foregoing method embodiments 1 and 2.

Figure 26:
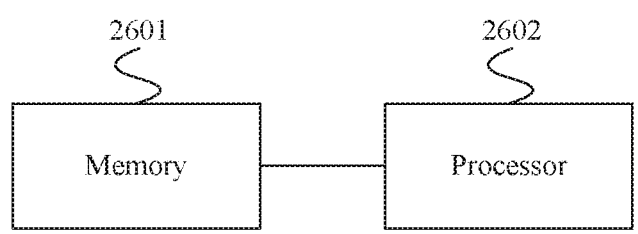
FIG. 26 is an entity block diagram of an embodiment of yet another centralized unit according to this application.

FIG. 26 is an entity block diagram of an embodiment of yet another centralized unit according to this application. As shown in FIG. 26, the centralized unit includes:

a memory 2601 and a processor 2602.

The memory 2601 is configured to store a program instruction, and the processor 2602 is configured to invoke the program instruction in the memory 2601, to implement functions of the centralized unit in the foregoing method embodiment 3.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present application are all or partially generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, a solid state disk (SSD)), or the like.

Persons skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer usable storage media (including but not limited to a disk memory, a CD-ROM, an optical memory, and the like) that include computer usable program code.

This application is described with reference to the flowcharts and/or block diagrams of the method, the apparatus (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may be stored in a computer readable memory that can instruct the computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of this application have been described, persons skilled in the art, can make changes and modifications to these embodiments once they learn the basic inventive concept. Therefore, the following claims are intended to be construed as to cover the preferred embodiments and all changes and modifications falling within the scope of this application.

Obviously, persons skilled in the art can make various modifications and variations to this application without departing from the scope of this application. This application is intended to cover these modifications and variations of this application provided that they fall within the scope defined by the claims of this application and their equivalent technologies.

What is claimed is:

1. A system, comprising: a distributed unit and a centralized unit;
   wherein the distributed unit is configured to:
   receive a radio resource control (RRC) connection request from a terminal;
   send a control plane message comprising the RRC connection request to the centralized unit through a control plane connection between the distributed unit and the centralized unit, wherein the control plane message comprising the RRC connection request further comprises:
      a first terminal identifier of the terminal,
      an identifier of a cell accessed by the terminal, and
      a second terminal identifier of the terminal,
      wherein the first terminal identifier identifies the terminal on an air interface, and the second terminal identifier is an identifier allocated by the distributed unit for the terminal on the control plane connection;
   receive through the control plane connection from the centralized unit, a control plane message comprising an RRC connection establishment message, wherein the control plane message comprising the RRC connection establishment message further comprises a third terminal identifier of the terminal, wherein the third terminal identifier is an identifier allocated by the centralized unit for the terminal on the control plane connection; and
   send the RRC connection establishment message to the terminal.

2. The system according to claim 1, wherein the distributed unit is configured to:
   receive an RRC connection establishment complete message from the terminal; and
   send the RRC connection establishment complete message to the centralized unit and wherein the central unit is configured to:
   receive through the control plane connection from the distributed unit, the control plane message comprising the RRC connection request,
   send the control plane message comprising the RRC connection establishment message to the distributed unit through the control plane connection; and
   receive the RRC connection establishment complete message from the distributed unit.

3. The system according to claim 1, wherein the distributed unit is configured to:
   receive a random access request from the terminal; and
   send a random access response to the terminal, wherein the random access response comprises the first terminal identifier of the terminal.

4. The system according to claim 1, wherein the first terminal identifier of the terminal is allocated by the distributed unit.

5. The system according to claim 1, wherein the first terminal identifier of the terminal is a cell radio network temporary identifier (C-RNTI).

6. The system according to claim 1, wherein the distributed unit and the centralized unit are comprised in a base station;
   the distributed unit is configured to employ a radio link control (RLC) layer function of the base station, a media access control (MAC) layer function of the base station and a physical layer function of the base station; and
   the centralized unit is configured to employ an RRC layer function of the base station and a packet data convergence protocol (PDCP) layer function of the base station.

7. A method, comprising:
   receiving, by a distributed unit, a radio resource control (RRC) connection request sent by a terminal;
   sending, by the distributed unit, a control plane message comprising the RRC connection request to a centralized unit through a control plane connection between the distributed unit and the centralized unit, wherein the control plane message comprising the RRC connection request comprises:
      a first terminal identifier of the terminal,
      an identifier of a cell accessed by the terminal, and
      a second terminal identifier of the terminal,
      wherein the first terminal identifier identifies the terminal on an air interface, and the second terminal identifier is an identifier allocated by the distributed unit for the terminal on the control plane connection;
   receiving, by the distributed unit through the control plane connection, a control plane message that is sent by the centralized unit and that comprises an RRC connection establishment message, wherein the control plane message comprising the RRC connection establishment message further comprises a third terminal identifier of the terminal, wherein the third terminal identifier is an identifier allocated by the centralized unit for the terminal on the control plane connection; and
   sending, by the distributed unit, the RRC connection establishment message to the terminal.

8. The method according to claim 7, further comprising:
   receiving, by the distributed unit, an RRC connection establishment complete message sent by the terminal; and sending, by the distributed unit, the RRC connection establishment complete message to the centralized unit.

9. The method according to claim 7, wherein the method further comprises:
establishing, by the distributed unit, the control plane connection.

10. The method according to claim 7, wherein the method further comprises:
receiving, by the distributed unit, a random access request from the terminal; and
sending, by the distributed unit, a random access response to the terminal, wherein the random access response comprises the first terminal identifier of the terminal.

11. The method according to claim 7, wherein the first terminal identifier of the terminal is allocated by the distributed unit.

12. The method according to claim 7, wherein the first terminal identifier of the terminal is a cell radio network temporary identifier (C-RNTI).

13. The method according to claim 7, wherein the distributed unit and the centralized unit are comprised in a base station;
the distributed unit is configured to employ a radio link control (RLC) layer function of the base station, a media access control (MAC) layer function of the base station and a physical layer function of the base station; and
the centralized unit is configured to employ an RRC layer function of the base station and a packet data convergence protocol (PDCP) layer function of the base station.

14. A wireless connection control method, comprising:
receiving, by a centralized unit through a control plane connection between the centralized unit and a distributed unit, a control plane message that comprising a radio resource control (RRC) connection request from the distributed unit, wherein the control plane message comprising the RRC connection request further comprises:
a first terminal identifier of a terminal,
an identifier of a cell accessed by the terminal, and
a second terminal identifier of the terminal,
wherein the first terminal identifier identifies the terminal on an air interface, and the second terminal identifier is an identifier allocated by the distributed unit for the terminal on the control plane connection;
sending, by the centralized unit, a control plane message comprising an RRC connection establishment message to the distributed unit through the control plane connection, wherein the control plane message comprising the RRC connection establishment message further comprises a third terminal identifier of the terminal, wherein the third terminal identifier is an identifier allocated by the centralized unit for the terminal on the control plane connection; and
receiving, by the centralized unit, an RRC connection establishment complete message from the distributed unit.

15. The method according to claim 14, wherein the first terminal identifier of the terminal is a cell radio network temporary identifier (C-RNTI).

16. The method according to claim 14, wherein the distributed unit and the centralized unit are comprises in a base station;
the distributed unit is configured to employ a radio link control, RLC, layer function of the base station, a media access control, MAC, layer function of the base station and a physical layer function of the base station; and
the centralized unit is configured to employ an RRC layer function of the base station and a packet data convergence protocol (PDCP) layer function of the base station.

17. An apparatus, comprising at least one memory storing program instructions; and at least one processor, wherein the program instructions enable the at least one processor to:
receive a radio resource control (RRC) connection request from a terminal;
send a control plane message comprising the RRC connection request to a centralized unit through a control plane connection between the apparatus and the centralized unit, wherein the control plane message comprising the RRC connection request further comprises:
a first terminal identifier of the terminal,
an identifier of a cell accessed by the terminal, and
a second terminal identifier of the terminal,
wherein the first terminal identifier identifies the terminal on an air interface, and the second terminal identifier is an identifier allocated by the apparatus for the terminal on the control plane connection;
receive through the control plane connection from the centralized unit, a control plane message comprising an RRC connection establishment message, wherein the control plane message comprising the RRC connection establishment message further comprises a third terminal identifier of the terminal, wherein the third terminal identifier is an identifier allocated by the centralized unit for the terminal on the control plane connection; and
send the RRC connection establishment message to the terminal.

18. The apparatus according to claim 17, wherein the program instructions further enable the at least one processor to:
receive an RRC connection establishment complete message from the terminal; and
send the RRC connection establishment complete message to the centralized unit.

19. The apparatus according to claim 17, wherein the program instructions further enable the at least one processor to:
receive a random access request from the terminal; and
send a random access response to the terminal, wherein the random access response comprises the first terminal identifier of the terminal.

20. The apparatus according to claim 17, wherein the first terminal identifier of the terminal is allocated by the apparatus.

21. The apparatus according to claim 17, wherein the first terminal identifier of the terminal is a cell radio network temporary identifier (C-RNTI).

22. The apparatus according to claim 17, wherein the apparatus and the centralized unit are comprised in a base station;
the apparatus is configured to employ a radio link control (RLC) layer function of the base station, a media access control (MAC) layer function of the base station and a physical layer function of the base station; and
the centralized unit is configured to employ an RRC layer function of the base station and a packet data convergence protocol (PDCP) layer function of the base station.

23. An apparatus, comprising at least one memory having a storing program instructions and at least one processor, wherein the program instructions enable the at least one processor to:

receive through a control plane connection between the apparatus and a distributed unit, a control plane message comprising a radio resource control (RRC) connection request from the distributed unit, wherein the control plane message comprising the RRC connection request further comprises:

a first terminal identifier of a terminal,
        an identifier of a cell accessed by the terminal, and
        a second terminal identifier of the terminal,
        wherein the first terminal identifier identifies the terminal on an air interface, and the second terminal identifier is an identifier allocated by the distributed unit for the terminal on the control plane connection;

send a control plane message comprising an RRC connection establishment message to the distributed unit through the control plane connection, wherein the control plane message comprising the RRC connection establishment message further comprises a third terminal identifier of the terminal, wherein the third terminal identifier is an identifier allocated by the apparatus for the terminal on the control plane connection; and receive an RRC connection establishment complete message from the distributed unit.

24. The apparatus according to claim 23, wherein the first terminal identifier of the terminal is a cell radio network temporary identifier (C-RNTI).

25. The apparatus according to claim 23, wherein the distributed unit and the apparatus are comprised in a base station;

the distributed unit is configured to employ a radio link control (RLC) layer function of the base station, a media access control (MAC) layer function of the base station and a physical layer function of the base station; and the apparatus is configured to employ an RRC layer function of the base station and a packet data convergence protocol (PDCP) layer function of the base station.

* * * * *